United States Patent
Boden et al.

(12) 
(10) Patent No.: US 6,308,161 B1
(45) Date of Patent: Oct. 23, 2001

(54) SYSTEM AND METHOD FOR BUSINESS PROCESS SPACE DEFINITION

(75) Inventors: Edward Barnes Boden, Vestal, NY (US); Dennis Gregory Geiser, Cary, NC (US); Frank Vincent Paxhia, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,120

(22) Filed: Mar. 20, 1998

(51) Int. Cl.[7] .................................................. G06F 17/60
(52) U.S. Cl. ..................... 705/7; 705/8; 705/9; 705/11; 705/1; 700/97; 700/98; 700/99; 700/117
(58) Field of Search .................................. 705/1, 7, 8, 9, 705/11; 395/710, 701, 680; 707/4; 700/97, 98, 99, 117

(56) References Cited

U.S. PATENT DOCUMENTS

| | | | |
|---|---|---|---|
| 4,603,231 | 7/1986 | Reiffel et al. | 178/19 |
| 4,914,589 | 4/1990 | Crawford | 364/43.17 |
| 4,953,087 | 8/1990 | Crawford | 364/413.18 |
| 5,339,390 | 8/1994 | Robertson et al. | 395/157 |
| 5,548,699 | 8/1996 | Ishida et al. | 395/140 |

FOREIGN PATENT DOCUMENTS

| | | | | |
|---|---|---|---|---|
| 2271260 | 4/1994 | (GB) | | G06F/15/72 |
| 2 271 260 A | * 6/1994 | (GB) | | G08F/15/72 |
| 7200871 | 8/1995 | (JP) | | G06T/15/00 |

OTHER PUBLICATIONS

"Managing Workflow using Database Techniques" IBM Technical Disclosure Bulletin, V. 39, N.8, p. 199–201, Aug. 1996.*

J. L. Hellerstein, et al, "Flexible and Scalable Mechanism for Navigating Hierarchically Structured Measurement Data", *IBM Technical Disclosure Bulletin*, V. 38, N. 2, 2/95, p. 441–444.

A. W. Luniewski, et al, "Efficient Implementation of ACLS for Object–Oriented Systems", *IBM Technical Disclosure Bulletin*, V. 36, N. 3, 3/93, p. 329–331.

\* cited by examiner

Primary Examiner—Eric W. Stamber
Assistant Examiner—Raquel Alvarez
(74) Attorney, Agent, or Firm—Shelley M Beckstrand

(57) ABSTRACT

A method and system for representing business processes such as in a workflow model. Each of a plurality of processes is defined as a 3-tuple including a noun, a verb and an attribute, and a selected process is displayed as a point in navigation space. In this manner, business processes are classified and organized in terms of a 3-dimensional process navigation space facilitating process identification, decomposition and definition by traversal of this space.

16 Claims, 8 Drawing Sheets

SYSTEM AND METHOD FOR BUSINESS PROCESS SPACE DEFINITION

BACKGROUND OF THE INVENTION

1. Technical Field of the Invention

This invention relates to automated classification and organization of business processes. More particularly, this invention classifies and organizes business processes in terms of a 3-dimensional process space facilitating process identification, decomposition and definition by traversal of this space.

2. Background Art

Workflow, which relates to automatically interpreted business processes, is an emerging technology closely associated with business and corporate re-engineering activities. It is considered a cross-industry paradigm for reducing business costs, improving efficiencies and fundamental to the notion of adaptive business organizations. Business processes are defined in such a way that they can be directly interpreted and executed by a workflow server. A major inhibitor to the development of workflow is understanding the mechanisms, interactions and inter-relationships of these processes, because even small business will have hundreds, as workflow matures.

As a business begins employing workflow technology it must systematically defines its current and future processes. The large number of processes and subprocesses that even a medium-sized business will have must be coherently organized so that they can be used, changed, and understood. These business processes must be related to the business organization and the roles of the people.

System providers must deliver workflow solutions that are immediately useful for customers, and yet can be readily changed and augmented by the customers for their situation. Such providers need to deliver workflow solutions in the context of existing software. Further, provision must be made for readily and directly capturing in workflow solutions the policies a business uses to guide its activities. Processes impacted by such a policy need to be immediately and readily known within an overall business context.

It is an object of the invention to provide a system method for enabling understanding of the mechanisms, interactions and inter-relationships of business processes.

It is a further object of the invention to systematically define the current and future processes of an organization in a manner which facilitates understanding, use and change.

It is a further object of the invention to provide an overall business context in which to know and evaluate processes impacted by a policy.

SUMMARY OF THE INVENTION

This invention comprises a method and system for representing business processes. Each of a plurality of processes is defined as a 3-tuple including a noun, a verb and an attribute, and a selected process is displayed as a point in navigation space.

Other features and advantages of this invention will become apparent from the following detailed description of the presently preferred embodiment of the invention, taken in conjunction with the accompanying drawings.

BEST MODE FOR CARRYING OUT THE INVENTION

Acronyms

Figure 1:
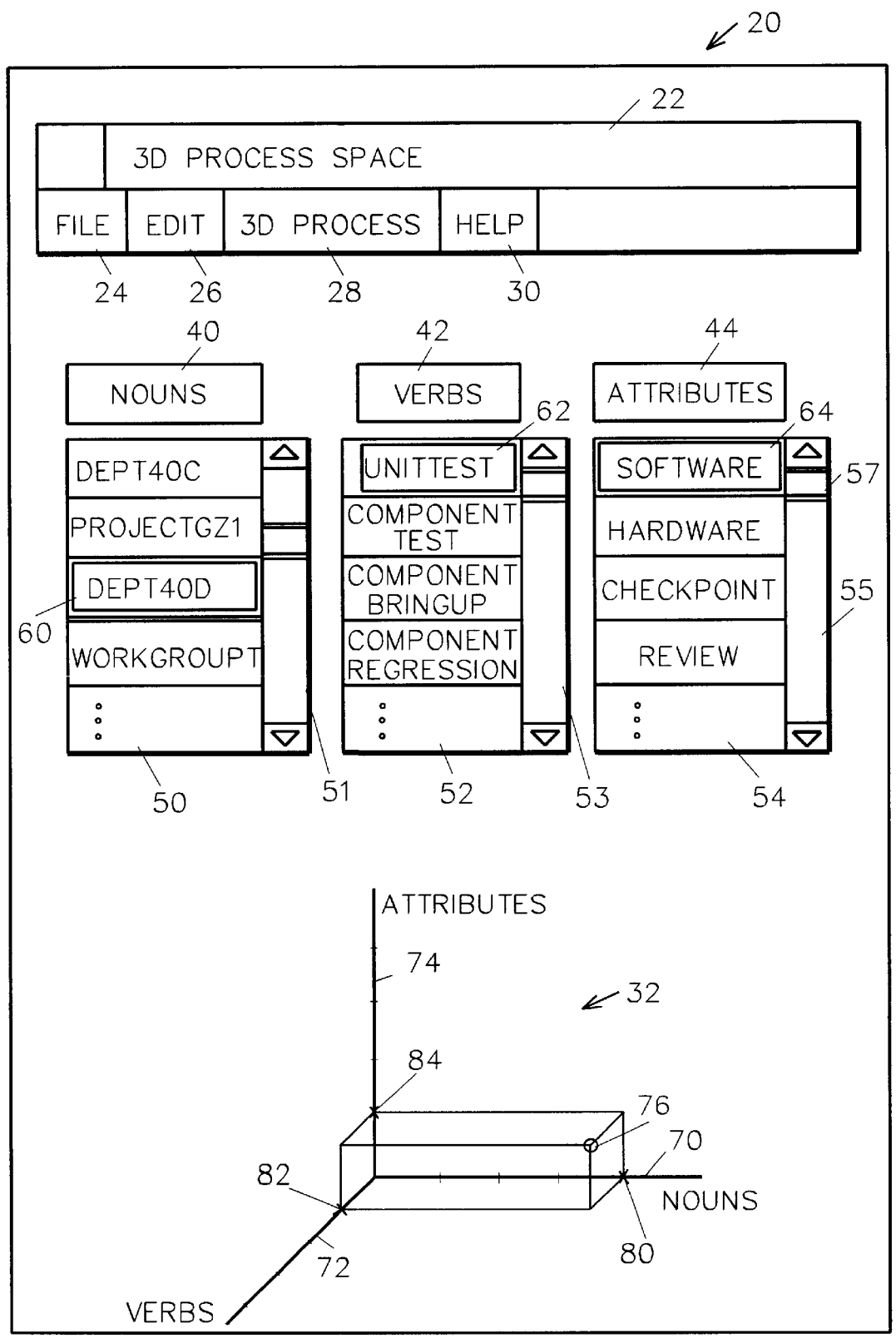
FIG. 1 illustrates a visual display of a process space defined by three dimensions in accordance with the invention.

+ Concatenation operator
.java File extension for a file of Java source code
API Application Programming Interface
GUI Graphical User Interface
java.awt Java Abstract Windowing Toolkit package
java.lang Java Language package

Description

In accordance with the invention, a process space is defined by three dimensions. Each point in the space represents a business process. Process decomposition and definition result from traversal of this space. The three dimensions are:

1. A verb dimension comprising a set of verbs or actions. In a specific business process domain like system management or banking processes, this dimension may be labeled the action dimension.
2. A noun dimension comprising a set of nouns. In a specific business process domain like banking or system management processes, this dimension may be labeled the managed resource object (MRO) dimension.
3. A characteristics, or attributes, dimension comprising a set of expressions which can be automatically evaluated and results in a Boolean value. A term for this dimension, for all process domains, that is more consistent with workflow and related process technologies is the policy dimension.

A point in this space is a 3-tuple: (verb, noun, attribute). A process is represented in navigation space by a point. In practice, although very large (order $10^{**}6$) spaces will be routinely defined, interpretable process definitions will exist only for a modest percentage (say, <10%) of the total space even in mature workflow businesses. Even this results in a large number of processes.

By way of example, dimension sets for verb, noun and attribute may include the following:
verb={add, delete, change, determine}
noun={account, balance, customer, loan, teller, interest}
attribute={<10%, overdue, >1000000, court order, audit, null }

And, given the above dimension sets, some process tuples may include the following:
(add, customer, null)
(determine, account, court order)
(change, interest, null)
(determine, teller, overdue)

Associated with the process space are the following important and useful properties:

1. The set that defines each dimension as shipped to customers (with a set of appropriate interpretable process definitions) is extendable by the customer. Thus, customers may add nouns (e.g., North Branch, South Branch), verbs (e.g., summarize, amortize), and policies (e.g., withdraw maximum) specific to their business.
2. Dimension extensions are immediately accepted by the process space presentation software as extensions to the space. This provides consistency of viewpoint, understandability, and simple navigation in the process space.
3. Elements of any one of the three dimension sets may be arbitrarily grouped by the customer.
4. New elements that are groups may be added to each dimension. This produces a simple way of understanding what otherwise would be a noncontiguous set of planes in the process space, effectively combining them into a single plane. These allow customers to work in their preferred terms (for example, North Branch accounts, formal audit control processes.)
5. Elements that are groups may be subset. That is, new elements added to a set may be defined as "in" or belonging to an existing element.
6. There are no inherent restrictions on what constitutes the definition of a noun. Thus, for example, a group of points in the process space may be named and the resulting noun added to the noun dimension set. Processes using existing or new verbs may then be defined for this group of processes. This allows the simple and direct specification of, for example, processes that only a Branch Manager may initiate (cause to be automatically interpreted) or those that only on-duty tellers may initiate.

Three core ideas fundamental to the invention include representation, navigation, and extension. Representation refers to the three dimensional space representation of processes. Navigation refers to the selection of a process point in three dimensional space, and clicking on that point to zoom in by opening up the source to another process definition. Extensibility refers to the definition on the fly of dimensions, and to groupings of scalar definitions into super scalar values. Once a few of these groupings are defined, the user can navigate in three dimensional space to group values, and from there can zoom back to three dimensional space representation of scalar values.

Referring to FIG. 1 a visual display of a process space defined by three dimensions in accordance with the invention includes display panel 20, title 22, menu bar 21 with menu buttons 24, 26, 28 and 30, navigation space 32, and scrollable lists 40, 42 and 44. Nouns scrollable list 40 includes a plurality of nouns 50 and scroll bar 51. Verbs scrollable list 42 includes verbs 52 and scroll bar 53. Attributes scrollable list 44 includes attributes 54 and scroll bar 55. Scroll bars 51, 53 and 55 may or may not be visible, depending upon the number of items 50, 52 and 54 in the respective lists 40, 42 and 44.

In this preferred embodiment of the invention, process point 76 appears in navigation space 32 in relation to nouns grid 70, verbs grid 72 and attributes grid 74 at the position 80, 82, 84 defined by the highlighted noun entry 60, highlighted verb entry 62 and highlighted attributes entry 64 in lists 40, 42 and 44 respectively. A single 3-tuple or point in navigation space 32 may be highlighted responsive to selection of one item from each of lists 40, 42 and 44. A slice or plane of points may be highlighted by selecting only two items. Thus, by selecting a noun item 60 and a verb item 62, navigation space 32 will highlight points (not shown) corresponding to all entries in attributes list 54. For a particular combination of noun and verb, non-relevant entries in attributes list 44 may be grey out (rendered not selectable), and corresponding points in the slice of navigation space 32 not highlighted.

An entry 66 in nouns list 40 entitled "workgroup T", "my domain", or the like, may be selected, causing list 40 to display a group of nouns defined by the user. Similar groupings may be provided in verbs list 42 and attributes list 44.

Buttons 24, 26, 28 and 30 may be selected in any traditional manner, such as by pointing and clicking, or by positioning a cursor and pressing enter, or the like. Similarly, entries 60, 62 and 64 may be selected by pointing and clicking with a pointing device, or by scrolling through lists 40, 42, and 44. Selected items 60, 62 and 64 define a 3-Tuple which is represented in navigation space 32 by a highlighted point, or some other such indicia.

Table 1 Main Window sets forth an extension of the java.awt.Frame class which, modified as set forth in Java-like psuedo code, defines an example process for generating the display of FIG. 1, and acts as the main window of the 3D process space application of this example embodiment of the invention. For the purpose of this example embodiment, lists 50, 52 and 54 are hard coded at Table 1, lines 56–64, 69–76 and 81–87, respectively. Alternatively, and preferably, these lists contents would be recorded externally and accessible and modifiable by the provider or user.

In general terms, the actual values shown in lists 50, 52, and 54 are controlled by the provider or user. Hence these would be stored externally to the source code shown in Table 1 on some long-term electronic media such as a disk drive. Ancillary functions allow the user to change these lists. That is, add and delete individual items or change the names of individual items. These changes would then appear directly in the lists 50, 52 and 54 and in the corresponding dimension lines 70, 72 and 74, respectively, of 3-dimensional space diagram 32.

Figure 2:
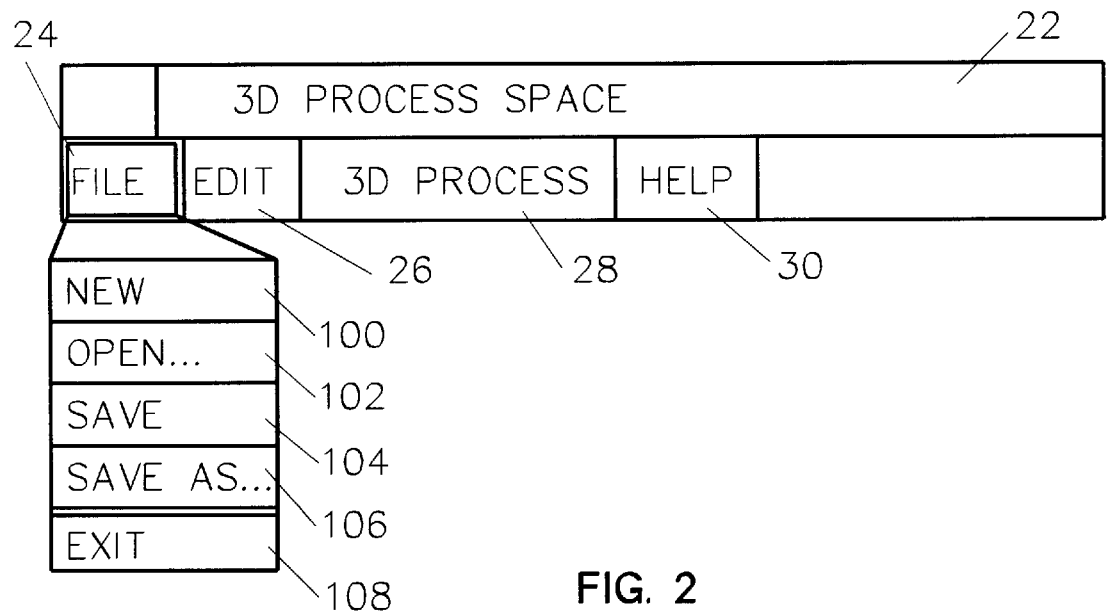
FIG. 2 illustrates a file menu pull down.

Referring to FIG. 2 a file menu pull down, actuated by selecting file menu button 24 includes file action items new 100, open 102, save 104, save as 106 and exit 108. File actions 100–108 have the meanings and perform the functions well known to those of ordinary skill in the art.

In Table 2 File Menu Pull Down Processing there is set forth a psuedo code reprentation of processes implementing file menu actions 100–108. Calls are made to Table 7 Process Space 180 when executing new 100, open 102, save 104 and save as 106.

When menu item 100 ('new') is activated (typically, by a computer mouse button push), the user is prompted for a file name and dimension names, the input information syntax is validated, then the new process space is created. When menu item 102 ('open') is activated, the user will be shown a window which allows selection of a directory and then, within that directory, a file. When a specific file is selected, or entered by name as also allowed by the window, the file is read and a new process space main window is created to reflect the contents of the file. When menu item 104 ('save') is selected, the process space in the window is saved to a file (secondary storage), using either the name of the file previously opened or the name entered by the user during the processing of 'new' 100. Menu item 106 ('save as') allows the user to change the name of an existing file to a new one. Menu item 108 ('exit') causes the current window to close, which also closes all associated file.

Figure 3:
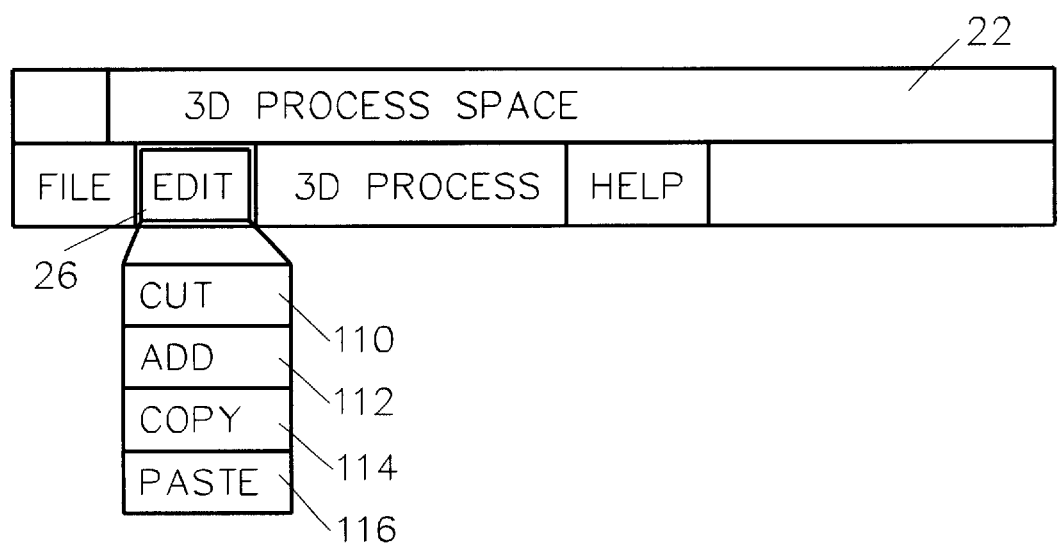
FIG. 3 illustrates an edit menu pull down.

Referring to FIG. 3 an edit menu pull down, actuated by selecting edit button 26 includes such items cut 110, add 112, copy 114 and paste 116. Edit actions 110–116 have the meanings and perform the functions will known to those of ordinary skill in the art.

In Table 3 Edit Menu Pull Down Processing there is set forth in Java and psuedo code processes for executing cut 110, add 112, copy 114 and paste 116.

When menu item 110 ('cut') in FIG. 3 is activated, a previously highlighted dimension item (e.g., 84 in FIG. 1) is removed from the dimension and the value saved in temporary area (often called the clipboard), as indicated by lines 3–11 of Table 3. When menu item 112 ('add') is activated (function indicated by lines 13–16 of Table 3), the user is prompted for a new dimension item (value, name) and the item is added to a dimension. The dimension may have been highlighted before the 'add' button 112 was activated or, if not, the user will be prompted for the dimension name. When menu item 114 ('copy') is activated (lines 13–21 of Table 3) the highlighted dimension item is saved in a temporary area for possible later use, and (in contrast to 'cut') this item is not removed from its dimension. When menu item 116 ('paste') is activated (lines 23–25 of Table 3) a dimension item is retrieved from temporary storage and added to the highlighted dimension. This will be an item placed in temporary storage by some (not necessarily immediate) previous 'cut' or 'copy' action. Menu items may be greyed out if the action is inappropriate. For example, paste is greyed out until a cut or copy has been done.

Figure 4:
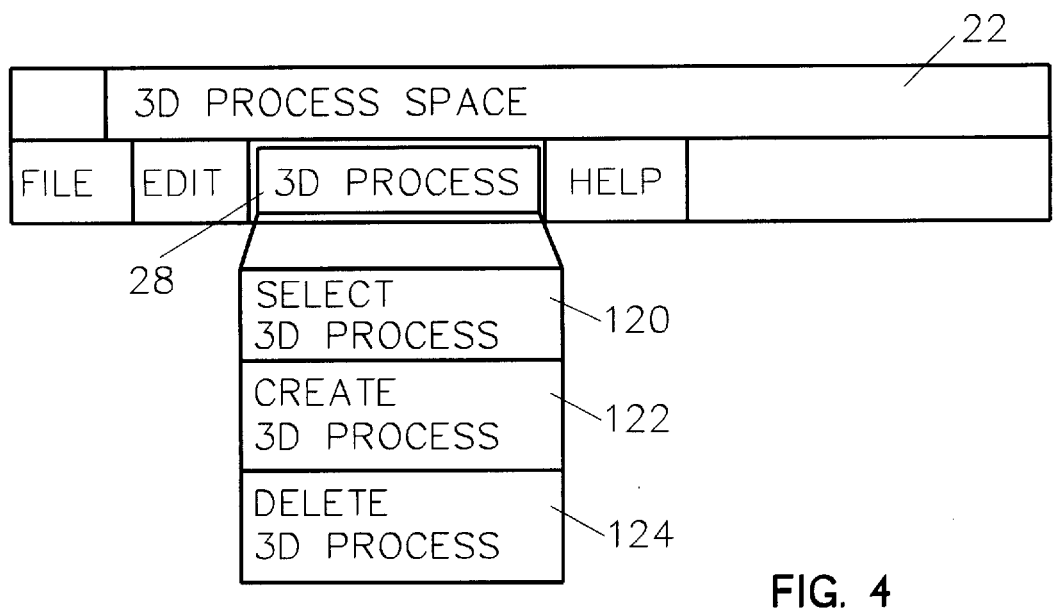
FIG. 4 illustrates a process menu pull down.

Referring to FIG. 4 a process menu pull down, actuated by selecting process button 28, includes such items as select 3D process 120, create 3D process 122 and delete 3D process 124.

In Table 4 3D Process Menu Pull Down Processing there is set forth in psuedo code processes for executing select 3D process 120, create 3D process 122 and delete 3D process 124. After prompting the user for input parameters, calls are made to Table 7 Process Space 180.

When menu item 120 ('select 3D process') from FIG. 4 is activated (typically via a computer mouse button push), the user is prompted (lines 8–10 of Table 4) for a name of a 3D space. A dialogue will allow the selection of a space name from a list of existing names, and will also allow the user to navigate directories. When menu item 122 ('create 3D process') is activated (lines 12–16 of Table 4) the user is prompted for a space name and dimensions. The space is created and a new window is shown which presents the new space (another copy of window shown in FIG. 1, with the new space). When menu item 124 ('delete 3D process') is activated (lines 18–20 of Table 4) the user is prompted for a space name, and the space is deleted (if it exists in the current working directory).

Figure 5:
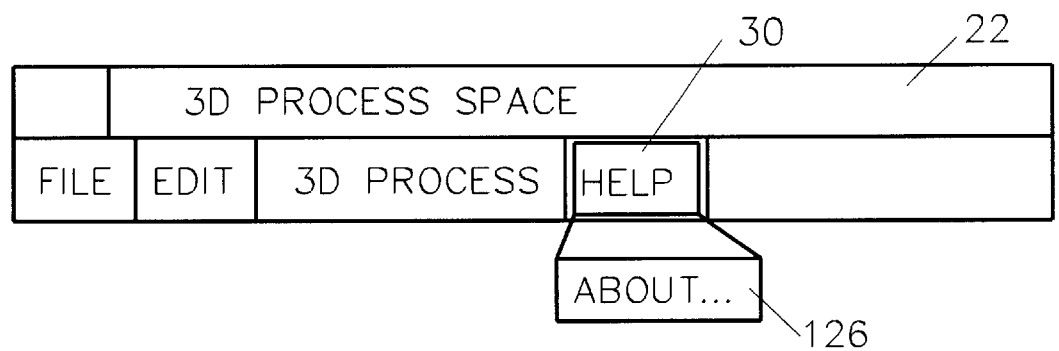
FIG. 5 illustrates a help menu pull down.

Referring to FIG. 5 a help menu pull down, actuated by selecting help button 30 includes such items as about 126. Help action item 126, and other help action items not listed, have the meanings and perform the functions will known to those of ordinary skill in the art, and will not be further discussed.

Figure 6:
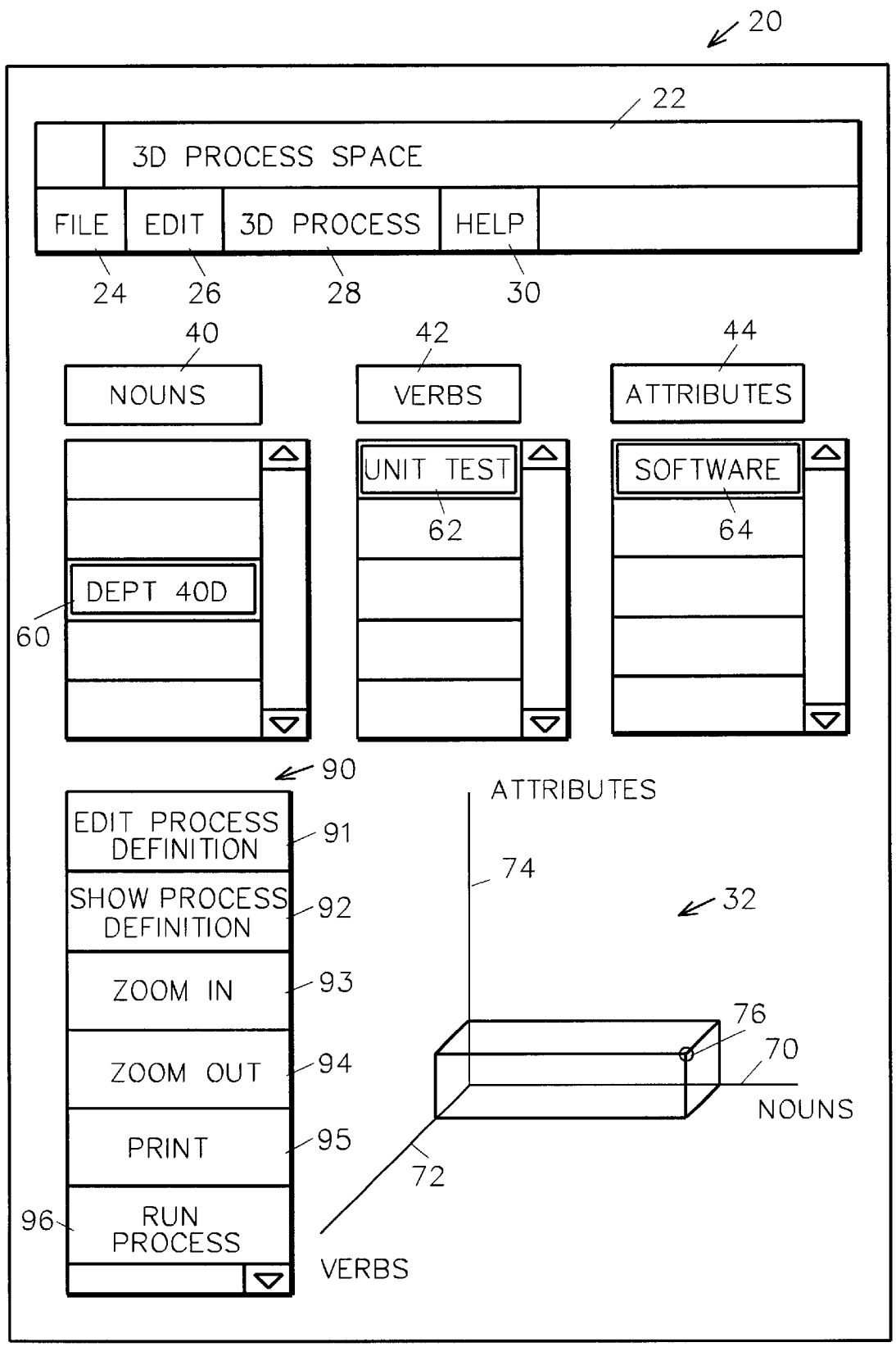
FIG. 6 illustrates a choice box.

Referring to FIG. 6 a choice box 90 is preferably displayed responsive to selection by right mouse button clicking of a pointing device on process point 76. Alternatively, and as implemented in Table 5, choice box 90 is displayed responsive to clicking the right or left mouse button with the pointer positioned anywhere in navigation space 32. Choice box 90 includes a plurality of action items edit 91, show process definition 92, zoom in 93, zoom out 94, print 95, and run process 96 which may be selected by scrolling or pointing and clicking, as will be apparent to those skilled in the art. Depending upon the authorization level of the user, some options 91–96 may be "greyed out", that is, not available. For example, not all users are authorized to edit; in which event, item 91 would "greyed out".

Figure 7:
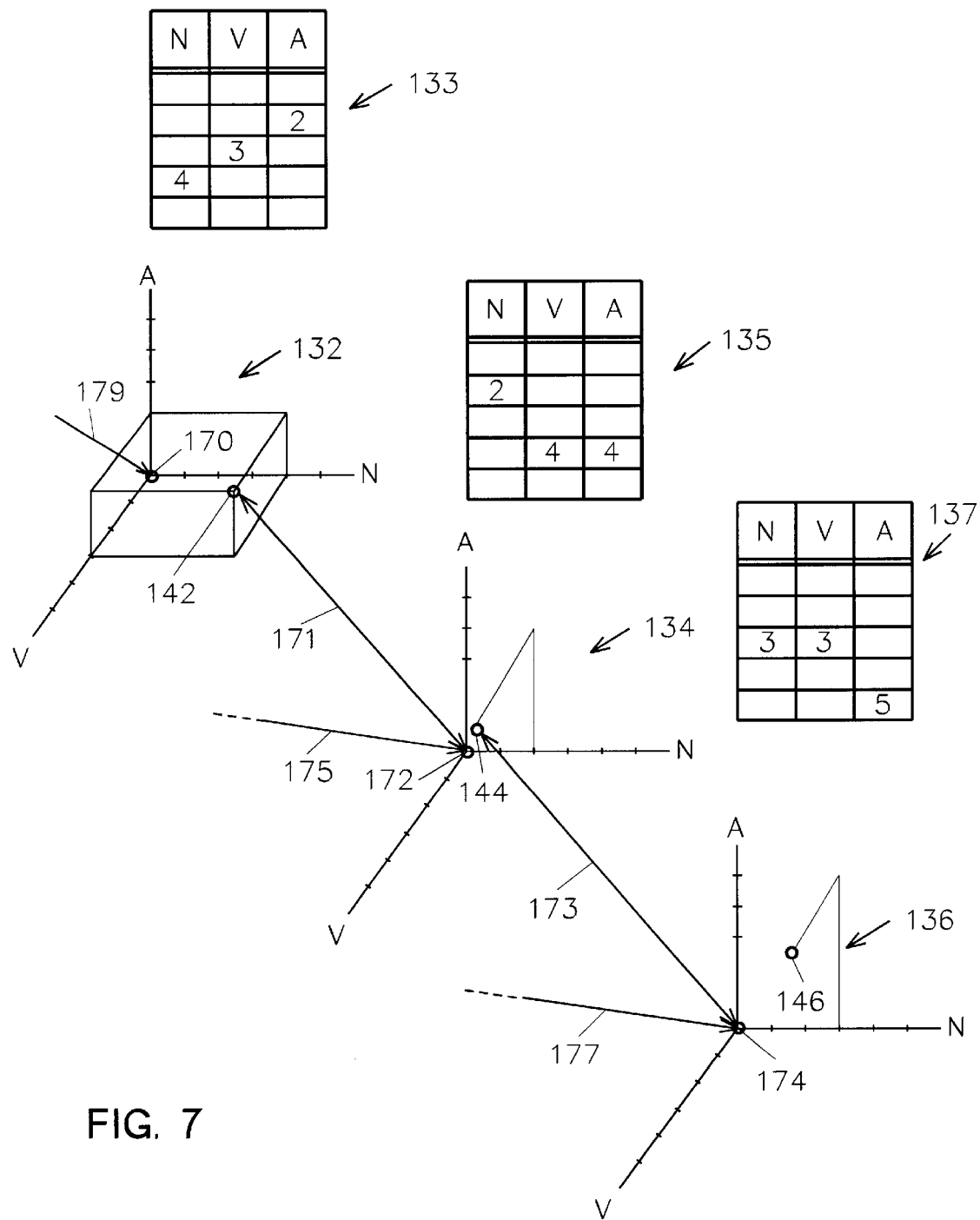
FIG. 7 illustrates traversal of business process space by zoom in and zoom out processing.

Referring to FIG. 7 traversal of business process space by zoom in and zoom out processing is illustrated. In this illustration, navigation space 32 is illustrated in a series of three panels comprising, respectively, navigation space 132 and scrollable lists 133, navigation space 134 and scrollable lists 135, and navigation space 136 and scrollable lists 137. Process 3-tuple 142 is highlighted in navigation space 132 at the grid positions corresponding to the fourth noun, third verb and second attribute in scrollable lists 133. Process 3-tuple 144 is highlighted in navigation space 134 at the grid positions corresponding to the second noun, the fourth verb and the fourth attribute in scrollable lists 135. Process 3-tuple 146 is highlighted in navigation space 136 at the grid positions corresponding to the third noun, the third verb and the fifth attribute in scrollable lists 137. Points can contain a space, in which case they know the origin of it. Process, or navigation, space 136 is nested in point 144, and process space 134 is nested in process point 142.

Figure 8:
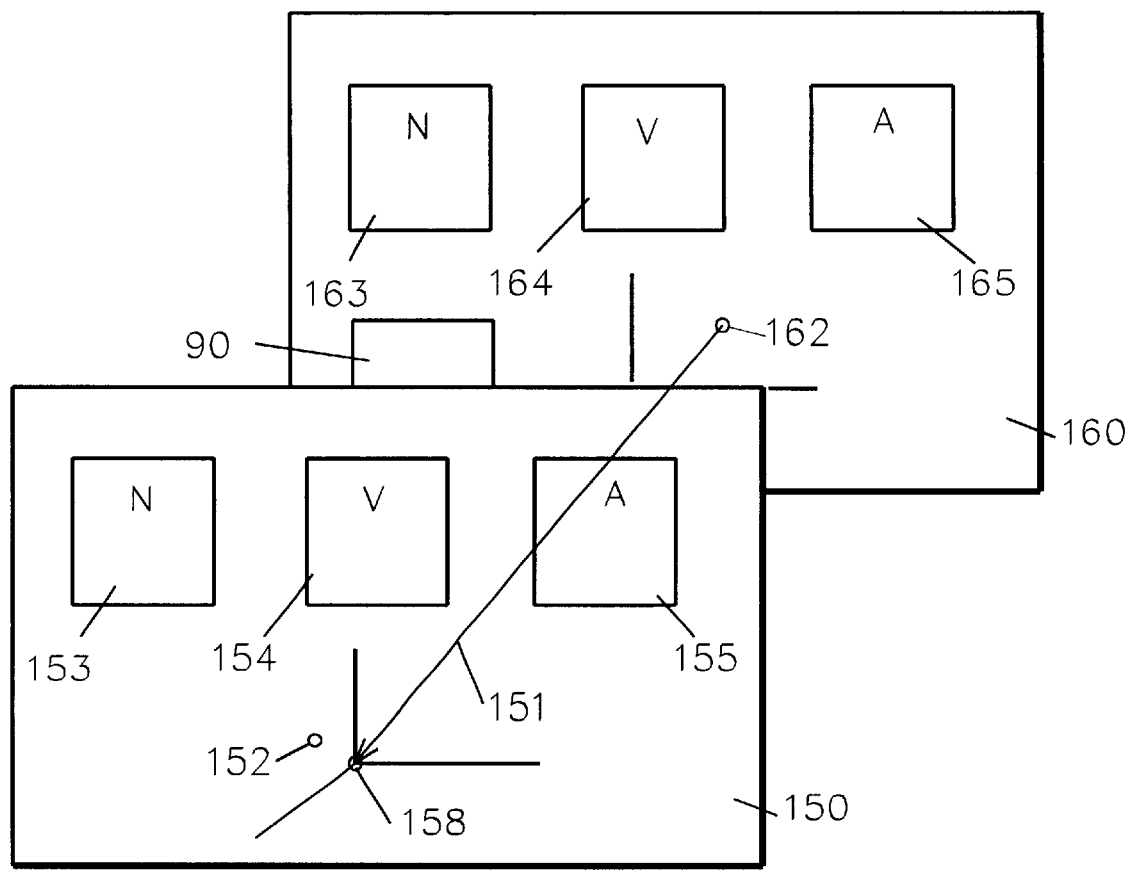
FIG. 8 illustrates nested process spaces.

Referring to FIG. 8 nested process spaces 150 and 160 are illustrated. These may be visible in two panels in display 20, with process point 162 corresponding to the grid location specified by noun item 163, verb item 164 and attribute item 165. As is represented by line 151 from process point 162 to the origin 158 of navigation space 150, selecting a zoom command in choice box 90, panel 150 is opened and the zoom'd to space 150, containing point 152 among other possibilities is highlighted along with corresponding entries in noun list 153, verb list 154 and attribute list 155.

In Table 5 Mouse Adapter and Table 6 Choice Panel are set forth Java and psuedo code representations of the processes for selecting choice box 90 and executing its functions, show process definition 92, zoom in 93, zoom out 94, print 95 and run process 96. For zoom in, the selected process point 162 is checked for zoomability. If it is zoomable, a new window 150 appears showing the nested (zoomed in) space. Point 162 in panel 160 may be highlighted to identify which space in display 160 is represented by display 150. If process point 162 is not zoomable, point 152 is created along with its containing space.

Figure 9:
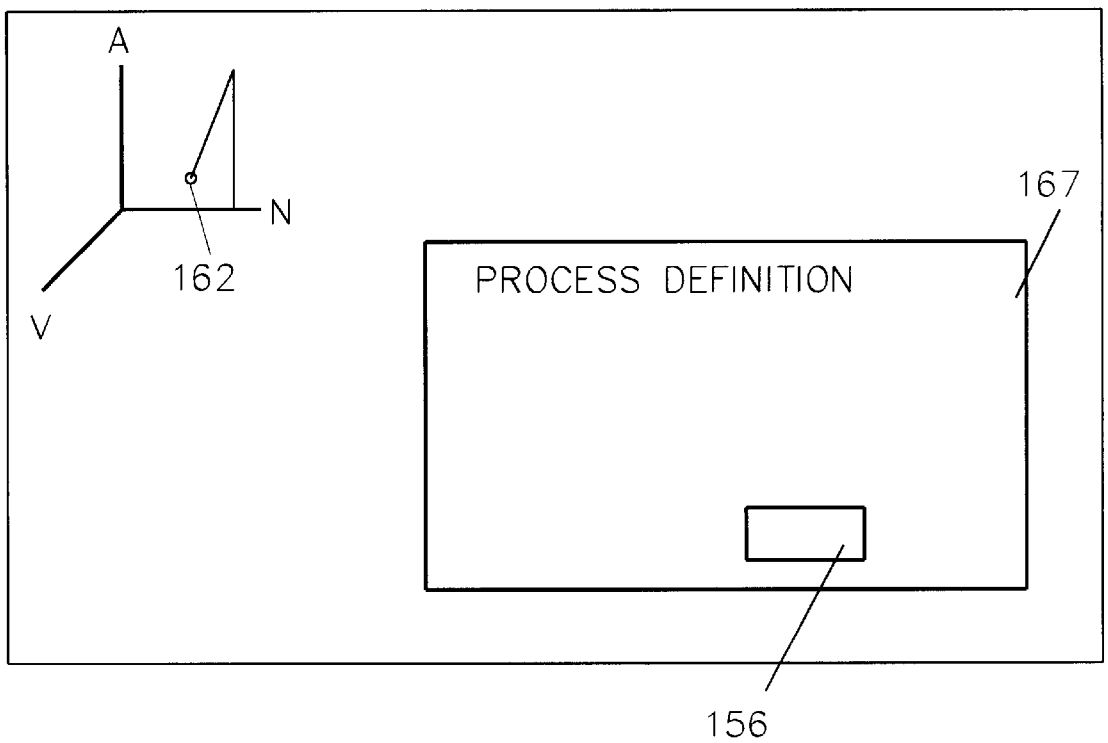
FIG. 9 illustrates a process definition window.

Referring to FIG. 7, traversal of nested process spaces is shown. Process space 134 is nested with process point 142, as indicated by arrow 171 from 142 to the origin point 172 of space 134. Similarly, process space 136 with origin pont 174 is nested within process point 144 as shown by arrow 173. Conceptually, any collection of process points defines a process space. Hence the subprocesses that comprise a process point such as 142 implicitly define their own space 134. Process point 144 is one of the subprocesses that comprise process 142. This kind of nesting is handled automatically by the system as a customer defines business processes, and then uses lower level process points which have process definitions (FIG. 9). The nesting relationship is directly the result of referring to other processes in the definition of a process.

At a minimum, the nested space contains only the subprocesses used in the definition. The minimal values of each dimension are completely determined as the union, for each dimension, of all the elements referenced in all the definitions. For example, the values for the noun dimension is the union of the noun references from each of the processes in the space. Similarly for the attribute dimension and verb dimension.

In addition, a customer may explicitly add process points to a process space, which are not part of the processes used to define a containing process point. These additional points will cause the value of each dimension to be automatically adjusted to encompass any new nouns, verbs or attributes.

When a space is displayed as the result of a 'zoom-in' operation (FIG. 6, item 93), processes in nested space that are explicitly referenced in the containing process point are highlighted, so that they are easily distinguished from non-referenced subprocesses. Of course, it is possible that all process points in the nested space will be highlighted, indicating that they are all referenced by the enclosing process.

Another aspect of process space nesting is that any given space may enclose more than one point. This is indicated in FIG. 7 by arrows 175, 177 and 179. More specifically, a process point may contain exactly zero or one directly nested process spaces. (A directly nested space is a space with no intervening process points. So, for example, space 134 is directly nested in point 142, and space 136 is not directly nested in point 142, while space 136 is directly nested in point 144.) A process space may be enclosed by zero or n process points, where n is logically unlimited.

A process point is termed 'zoomable' if a zoom-out or zoom-in operation can be performed on it. A zoom-in operation is possible if the process point contains a subprocess as part of its definition. A zoom-out operation is possible if the process space containing the process point is contained within another process point. (If multiply contained, the user is prompted during the zoom-out operation, to select the containing process point.) In general, for a process space, only zoom out is defined. In general, for a process point, zoom in and zoom out are defined; zoom in is defined in terms of the existence of subprocesses as part of the process definition of the process point, and zoom out is through the origin point of the process space containing the process point.

These data modeling relationships and functions are depicted in Tables 7 through 11. The functions depicted provide the underlying data model, used by the functions in Tables 11 through 6, to produce the displays depicted in FIGS. 1 through 6, 8 and 9.

FIG. 8 shows how the traversal from a process point to its nested process space, shown logically in FIG. 7, looks to a user as shown in display windows. In this depiction, the user has selected menu item 93 ('zoom-in'), from menu 90 while process point 162 was highlighted. Processing resulted in the overlay display window 150, showing the contained space and its process points including 152 within the navigation space about origin 158. The process points actually referenced by point 162 will be highlighted.

Referring to FIG. 9 process definition window 167 is illustrated. Upon selecting show process definition 92 from choice box 90 with process point 162 highlighted, process definition 164 for process 162 is provided. Embedded object 156 in definition 167 may be selected, for example, to pull in and display addition material, or to execute the process.

Figure 10:
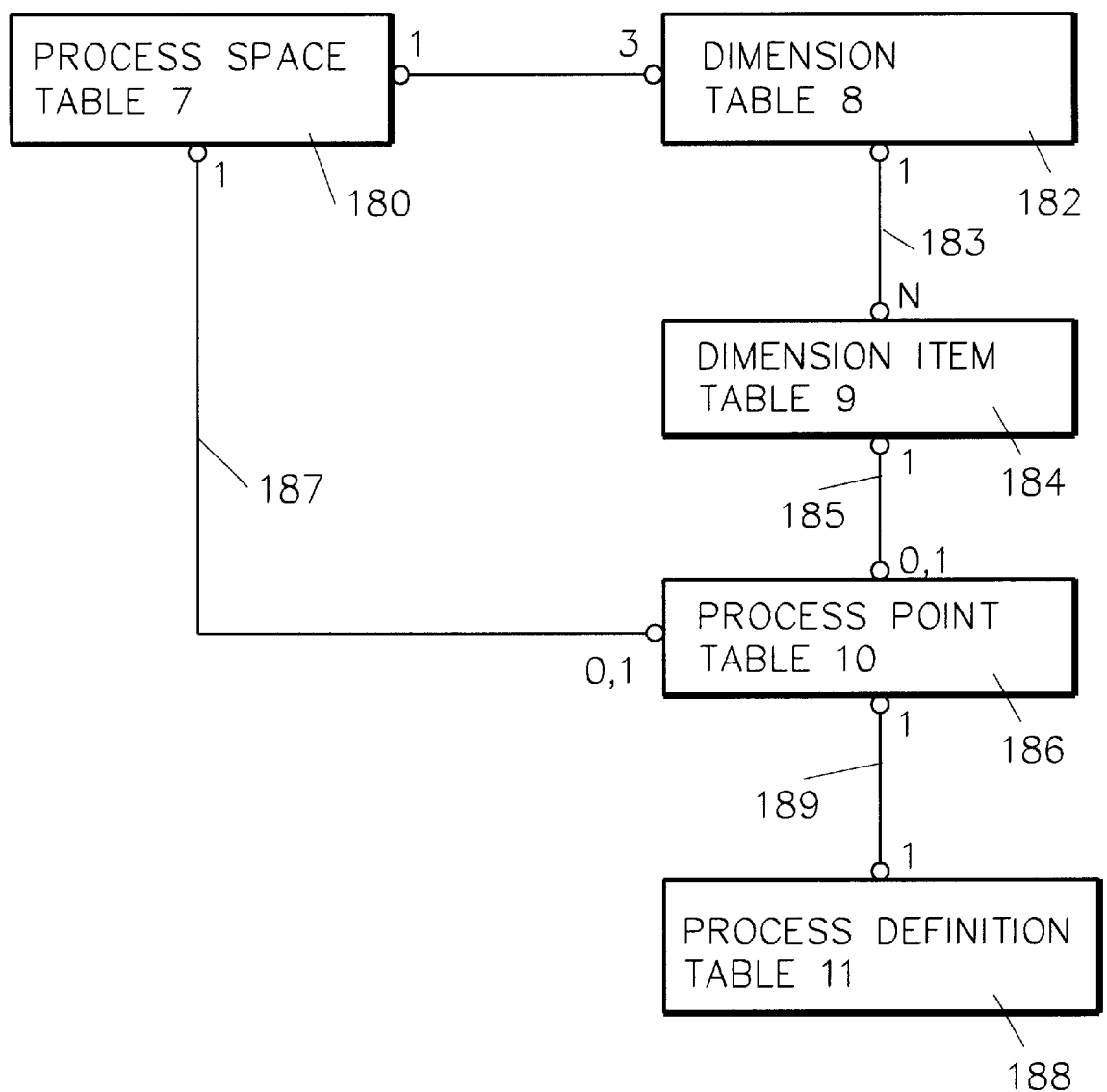
FIG. 10 illustrates the interrelationship of various code modules implementing a preferred embodiment of the invention.

Referring to FIG. 10 the interrelationships of various code modules implementing a preferred embodiment of the invention are illustrated. As is represented by lines 181 and 187, for each entry in process space 180 there exists three dimensions 182 and zero or one process points 186. As is represented by line 183, for each entry in dimension 182 there exists any number n of dimension items. As is represented by line 185, for each dimension item 184 there exists zero or one process points. As is represented by line 189, for each entry in process point 186 there exists one process definition 188.

Java code and Java-like psuedo code representations of process space 180, dimension 182, dimension item 184, process point 186, and process definition 188 are set forth in Tables 7, 8, 9, 10, and 11, respectively.

Referring to Table 7, the basic functions of an implementation of the process space data model are depicted. Lines 10–75 provide methods of process space creation, used by the interface generation functions as described, for example, in FIG. 4, menu item 122. Lines 76–81 provide a means to obtain a specific dimension for the process space. This would be used, for example, in generating the diagram dimensions 70, 72, 74 and list boxes 40, 42, 44 in FIG. 1.

Lines 82–106 provide a means to nest the current process point within another process space, by means of the special process point known as the origin point. Line 107 provides the low level function to zoom out (refer to 93 on FIG. 6). Lines 108–165 provide various utility functions used by the interface functions (Tables 1–6) to determine information about the process space, such as number of process points it contains (lines 111–129). Lines 166–219 are provided for stand-alone testing of the process space implementation.

Referring to Table 8, an implementation of the dimension abstraction 181 (FIG. 10) used by the process space (Table 7) is given. Lines 16–50 provide the basic functions of create, add item, delete item. These would be invoked by the interface level functions, for example, when the customer adds verbs to the list box 42 (FIG. 1). Lines 51–94 are basic dimension utilities and navigation functions. For example, lines 87–93 would be used by interface level functions to determine actual values to display in the list boxes 40, 42, 44 and the corresponding diagram dimensions 70, 72, 74 (FIG. 1).

Referring to Table 9, an implementation of the dimension item abstraction is given. These abstractions are the objects actually contained in dimensions 183 (FIG. 10). Lines 14–22 provide functions to create a dimension item, and are invoked by the interface functions, for example, when in FIG. 1, a new attribute item is added to list box 44. Lines 23–34 provide the basic functions to obtain the contents of a dimension item and to change it.

Referring to Table 10, an implementation of the process point abstraction is depicted. This is the abstraction indirectly referenced by all the interface functions when a process point is depicted, and directly used by the data model functions, as shown in 185 and 187 of FIG. 10. For example, these include process point 76 in FIG. 1 and points 142, 144 and 146 in FIG. 7, and point 169 in FIG. 9. Lines 13–17 provide means to create a process point. Lines 29–80, 100 allow for setting and retrieving the process definition associated with a process point, and querying existence of a process definition. Lines 31–59 are basic navigation capabilities used by other data model functions and interface functions move from point-to-point and from a point to its 'position' in the process space as shown, for example, in diagram 32 of FIG. 1 and FIG. 6. If, for example, the user drags the point 76 in FIG. 1, successive neighbors of 76 would be shown, their position marked on the dimension lines, and the dimension value highlighted. This is accomplished by using these lines. Lines 60–85 are concerned with functions to support nested (contained) process spaces; create, delete. Lines 86–99 are the functions directly providing zoom in and zoom out capability, as used by the interface functions and described in reference to FIGS. 7 and 8. Lines 101–115 provide debugging convenience for this particular implementation.

Referring to Table 11, an implementation of the process definition abstraction is shown. This is used directly by the data model functions 189 in FIG. 10 to hold information about this process point's specific process definition. Lines 13–16 provide a means to create the abstraction. Lines 19–24 provide basic utilities. For example, lines 24ff would be used by the interface functions when building the display 167 depicted in FIG. 9. Lines 29–37 would be invoked by the interface functions when the user activates menu item 96 in FIG. 6.

Tables

TABLE 1

MAIN WINDOW

```
1    //---------------------------------------------------------------------------------------
2    //
3    //bps — Business Process Space pseudo code
4    /*
5            This simple extension of the java.awt.Frame class
6            contains all the elements necessary to act as the
7            main window of an application.
8    */
9    //---------------------------------------------------------------------------------------
10   import java.awt.*;
11   import symantec.itools.awt.BorderPanel;
12   import symantec.itools.awt.shape.VerticalLine;
13   import symantec.itools.awt.shape.HorizontalLine;
14   import symantec.itools.awt.shape.Line;
15   import symantec.itools.awt.shape.Circle;
16   public class Frame1 extends Frame
17   {
18           public Frame1()
19           {
30               //bps -----------------------------------------------------------------------
31               //bps Add constructors for Frame1() to build
32               //bps additional "frames" when zoomin or zoomout are
33               //bps invoked, or when file-new is invoked
34               //bps or when the 3DProcess process pulldown is used
35               //bps to "create" another space
36               //bps the idea being the dimension axis would have
37               //bps to be (potentially) changed,
38               //bps and the list items would have to be added
39               //bps accordingly
40               //bps -----------------------------------------------------------------------
41                   //{{INIT_CONTROLS
42                   setLayout(null);
43                   setVisible(false);
44                   setSize(insets().left + insets().right + 632, insets().top
45                       + insets().bottom + 305);
46                   openFileDialog1 = new java.awt.FileDialog(this);
47                   openFileDialog1.setMode(FileDialog.LOAD);
48                   openFileDialog1.setTitle("Open");
49                   //$$ openFileDialog1.move(24,0);
50               //bps The following dimension values for
51               //bps the noun, verb and attribute
52               //bps pull down lists are hard coded
53               //bps for this example. Alternatively, they
54               //bps may be input by the user.
55                   NounList = new java.awt.List(0,false);
56                   NounList.addItem("dept40a");
57                   NounList.addItem("dept40b");
58                   NounList.addItem("dept40c");
59                   NounList.addItem("projectgzl");
60                   NounList.addItem("dept40d");
61                   NounList.addItem("workgroupT");
62                   NounList.addItem("dept99");
63                   NounList.addItem("deptalpha");
64                   NounList.addItem("testers");
65                   add(NounList);
66                   NounList.setBounds(insets().left + 36,insets().top +
67                       84,144,60);
68                   VerbList = new java.awt.List(0,false);
69                   VerbList.addItem("unittest");
70                   VerbList.addItem("componenttest");
71                   VerbList.addItem("componentbringup");
72                   VerbList.addItem("componentregressiontest");
73                   VerbList.addItem("systemarch");
74                   VerbList.addItem("powerontest");
75                   VerbList.addItem("systemtest");
76                   VerbList.addItem("earlyship");
77                   add(VerbList);
78                   VerbList.setBounds(insets().left + 216,insets().top +
79                       84,144,60);
80                   AttributeList = new java.awt.List(0,false);
81                   AttributeList.addItem("software");
82                   AttributeList.addItem("hardware");
83                   AttributeList.addItem("checkpoint");
84                   AttributeList.addItem("review");
85                   AttributeList.addItem("marketing");
86                   AttributeList.addItem("planning");
87                   AttributeList.addItem("sales");
```

TABLE 1-continued

MAIN WINDOW

```
 88    add(AttributeList);
 89    AttributeList.setBounds(insets().left + 396,insets().top +
 90         84,144,60);
 91    labelnoun = new java.awt.Label("Nouns");
 92    labelnoun.setBounds(insets().left + 36,insets().top +
 93         36,100,40);
 94    add(labelnoun);
 95    labelverb = new java.awt.Label("Verbs");
 96    labelverb.setBounds(insets().left + 216,insets().top +
 97         36,100,40);
 98    add(labelverb);
 99    labelattributes = new
100         java.awt.Label("Attributes");
101    labelattributes.setBounds(insets().left + 396,insets().top +
102         36,100,40);
103    add(labelattributes);
104    borderPanel1 = new symantec.itools.awt.BorderPanel();
105    borderPanel1.setLayout(null);
106    borderPanel1.setBounds(insets().left + 48,insets().top +
107         156,480,372);
108    add(borderPanel1);
109    ReflectAttributes = new
110         symantec.itools.awt.shape.VerticalLine();
111    ReflectAttributes.setBounds(122,0,2,156);
112    borderPanel1.add(ReflectAttributes);
113    ReflectNouns = new
114         symantec.itools.awt.shape.HorizontalLine();
115    ReflectNouns.setBounds(122,156,216,2);
116    borderPanel1.add(ReflectNouns);
117    ReflectVerbs = new
118         symantec.itools.awt.shape.Line();
119    try {
120         ReflectVerbs.setLineThickness(2);
121    }
122    catch(java.beans.PropertyVetoException e) { }
123    try {
124         ReflectVerbs.setPositiveSlope(true);
125    }
126    catch(java.beans.PropertyVetoException e) { }
127    ReflectVerbs.setBounds(-34,156,156,156);
128    borderPanel1.add(ReflectVerbs);
129    label1 = new java.awt.Label("Nouns");
130    label1.setBounds(338,156,100,40);
131    borderPanel1.add(label1);
132    label2 = new java.awt.Label("Verbs");
133    label2.setBounds(26,252,36,24);
134    borderPanel1.add(label2);
135    label3 = new java.awt.Label("Attributes");
136    label3.setBounds(134,-12,100,40);
137    borderPanel1.add(label3);
138    CircleCursor = new symantec.itools.awt.shape.Circle();
139    try {
140         CircleCursor.setFillColor(new Color(16711935));
141    }
142    catch(java.beans.PropertyVetoException e) { }
143    try {
144         CircleCursor.setFillMode(true);
145    }
146    catch(java.beans.PropertyVetoException e) { }
147    CircleCursor.setBounds(122,156,6,6);
148    CircleCursor.setForeground(new Color(16711935));
149    borderPanel1.add(CircleCursor);
150    CircleCursorMem = new
151         symantec.itools.awt.shape.Circle();
152    CircleCursorMem.setVisible(false);
153    CircleCursorMem.setBounds(122,156,6,6);
154    borderPanel1.add(CircleCursorMem);
155    choice1 = new java.awt.Choice();
156    choice1.addItem("ShowProcessDefinition");
157    choice1.addItem("Zoom In");
158    choice1.addItem("Zoom Out");
159    choice1.addItem("Print");
160    choice1.addItem("Run Process");
161    try {
162         choice1.select(-1);
163    } catch (IllegalArgumentException e) { }
164    choice1.setVisible(false);
```

TABLE 1-continued

| | MAIN WINDOW |
|---|---|
| 165 | borderPanel1.add(choice1); |
| 166 | choice1.setBounds(218,204,100,40); |
| 167 | label4 = new java.awt.Label("software"); |
| 168 | label4.setBounds(74,72,48,16); |
| 169 | borderPanel1.add(label4); |
| 170 | label5 = new java.awt.Label("dept40d"); |
| 171 | label5.setBounds(158,132,48,16); |
| 172 | borderPanel1.add(label5); |
| 173 | label6 = new java.awt.Label("unittest"); |
| 174 | label6.setBounds(14,192,48,16); |
| 175 | borderPanel1.add(label6); |
| 176 | setTitle("3DProcessSpace"); |
| 177 | //}} |
| 178 | //pax |
| 179 | circurpoint = new java.awt.Point(122,156); |
| 180 | borderPanel1.add(circurpoint); |
| 181 | //{{INIT_MENUS |
| 182 | mainMenuBar = new java.awt.MenuBar(); |
| 183 | menu1 = new java.awt.Menu("File"); |
| 184 | miNew = new java.awt.MenuItem("New"); |
| 185 | menu1.add(miNew); |
| 186 | miOpen = new java.awt.MenuItem("Open . . . ") |
| 187 | menu1.add(miOpen); |
| 188 | miSave = new java.awt.MenuItem("Save"); |
| 189 | menu1.add(miSave); |
| 190 | miSaveAs = new java.awt.MenuItem("Save As . . . "); |
| 191 | menu1.add(miSaveAs); |
| 192 | menu1.addSeparator(); |
| 193 | miExit = new java.awt.MenuItem("Exit"); |
| 194 | menu1.add(miExit); |
| 195 | mainMenuBar.add(menu1); |
| 196 | menu2 = new java.awt.Menu("Edit"); |
| 197 | miCut = new java.awt.MenuItem("Cut"); |
| 198 | menu2.add(miCut); |
| 199 | menuItem1 = new java.awt.MenuItem("Add"); |
| 200 | menu2.add(menuItem1); |
| 201 | miCopy = new java.awt.MenuItem("Copy"); |
| 202 | menu2.add(miCopy); |
| 203 | miPaste = new java.awt.MenuItem("Paste"); |
| 204 | menu2.add(miPaste); |
| 205 | mainMenuBar.add(menu2); |
| 206 | TDProcess = new java.awt.Menu("3DProcess"); |
| 207 | S3DProcess = new java.awt.MenuItem("Select3DProcess . . . "); |
| 208 | TDProcess.add(S3DProcess); |
| 209 | C3DProcess = new java.awt.MenuItem("Create3DProcess"); |
| 210 | TDProcess.add(C3DProcess); |
| 211 | D3DProcess = new java.awt.MenuItem("Delete3DProcess"); |
| 212 | TDProcess.add(D3DProcess); |
| 213 | mainMenuBar.add(TDProcess); |
| 214 | menu3 = new java.awt.Menu("Help"); |
| 215 | mainMenuBar.setHelpMenu(menu3); |
| 216 | miAbout = new java.awt.MenuItem("About . . . "); |
| 217 | menu3.add(miAbout); |
| 218 | mainMenuBar.add(menu3); |
| 219 | setMenuBar(mainMenuBar); |
| 220 | //$$ mainMenuBar.move(0,0); |
| 221 | //}} |
| 222 | //{{REGISTER_LISTENERS |
| 223 | SymWindow aSymWindow = new SymWindow(); |
| 224 | this.addWindowListener(aSymWindow); |
| 225 | SymAction lSymAction = new SymAction(); |
| 226 | miOpen.addActionListener(lSymAction); |
| 227 | miAbout.addActionListener(lSymAction); |
| 228 | miExit.addActionListener(lSymAction); |
| 229 | //bps Add listeners here for main |
| 230 | //bps menu items |
| 231 | //bps for selecting, creating and deleting 3 d |
| 232 | //bps process spaces |
| 233 | SymItem lSymItem = new SymItem(); |
| 234 | NounList.addItemListener(lSymItem); |
| 235 | VerbList.addItemListener(lSymItem); |
| 236 | AttributeList.addItemListener(lSymItem); |
| 237 | SymMouse aSymMouse = new SymMouse(); |
| 238 | NounList.addMouseListener(aSymMouse); |
| 239 | VerbList.addMouseListener(aSymMouse); |
| 240 | AttributeList.addMouseListener(aSymMouse); |
| 241 | SymMouseMotion aSymMouseMotion = new SymMouseMotion(); |

TABLE 1-continued

MAIN WINDOW

```
242                 NounList.addMouseMotionListener(aSymMouseMotion);
243                 VerbList.addMouseMotionListener(aSymMouseMotion);
244                 AttributeList.addMouseMotionListener(aSymMouseMotion);
245                 borderPanel1.addMouseListener(aSymMouse);
246                 //}}
247         }
248         public Frame1(String title)
249         {
250             this();
251             setTitle(title);
252         }
253         public synchronized void show()
254         {
255             move(50, 50);
256             super.show();
257         }
258         static public void main(String args[])
259         {
260             (new Frame1()).show();
261         }
262         public void addNotify()
263         {
264         // Record the size of the window prior to calling
265         // parents addNotify.
266             Dimension d = getSize();
267
268             super.addNotify();
269             if (fComponentsAdjusted)
270                 return;
271             // Adjust components according to the insets
272             setSize(insets().left + insets().right + d.width,
273                 insets().top + insets().bottom + d.height);
274             Component components[] = getComponents();
275             for (int i = 0; i < components.length; i++)
276             {
277                 Point p = components[i].getLocation();
278                 p.translate(insets().left, insets().top);
279                 components[i].setLocation(p);
280             }
281             fComponentsAdjusted = true;
282         }
283         // Used for addNotify check.
284         boolean fComponentsAdjusted = false;
285
286         //{{DECLARE_CONTROLS
287         java.awt.FileDialog openFileDialog1;
288         java.awt.List NounList;
289         java.awt.List VerbList;
290         java.awt.List AttributeList;
291         java.awt.Label labelnoun;
292         java.awt.Label labelverb;
293         java.awt.Label labelattributes;
294         symantec.itools.awt.BorderPanel borderPanel1;
295         symantec.itools.awt.shape.VerticalLine ReflectAttributes;
296         symantec.itools.awt.shape.HorizontalLine ReflectNouns;
297         symantec.itools.awt.shape.Line ReflectVerbs;
298         java.awt.Label label1;
299         java.awt.Label label2;
300         java.awt.Label label3;
301         symantec.itools.awt.shape.Circle CircleCursor;
302         symantec.itools.awt.shape.Circle CircleCursorMem;
303         java.awt.Choice choice1;
304         java.awt.Label label4;
305         java.awt.Label label5;
306         java.awt.Label label6;
307         //}}
308         //pax
309         java.awt.Point circurpoint;
310         //{{DECLARE_MENUS
311         java.awt.MenuBar mainMenuBar;
312         java.awt.Menu menu1;
313         java.awt.MenuItem miNew;
314         java.awt.MenuItem miOpen;
315         java.awt.MenuItem miSave;
316         java.awt.MenuItem miSaveAs;
317         java.awt.MenuItem miExit;
318         java.awt.Menu menu2;
```

TABLE 1-continued

MAIN WINDOW

```
319         java.awt.MenuItem miCut;
320         java.awt.MenuItem menuItem1;
321         java.awt.MenuItem miCopy;
322         java.awt.MenuItem miPaste;
323         java.awt.Menu TDProcess;
324         java.awt.MenuItem S3DProcess;
325         java.awt.MenuItem C3DProcess;
326         java.awt.MenuItem D3DProcess;
327         java.awt.Menu menu3;
328         java.awt.MenuItem miAbout;
329         //}}
330             class SymWindow extends java.awt.event.WindowAdapter
331             {
332                 public void windowClosing(java.awt.event.WindowEvent event)
333                 {
334                         Object object = event.getSource();
335                         if (object == Frame1.this)
336                             Frame1_WindowClosing(event);
337                 }
338             }
339             void Frame1_WindowClosing(java.awt.event.WindowEvent event)
340             {
341                 hide();          // hide the Frame
342                 dispose();       // free the system resources
343                 System.exit(0);  // close the application
344             }
345             class SymAction implements java.awt.event.ActionListener
346             {
347                 public void actionPerformed(java.awt.event.ActionEvent
348                     event)
349                 {
350                         Object object = event.getSource();
351                         if (object == miOpen)
352                             miOpen_Action(event);
353                         else if (object == miAbout)
354                             miAbout_Action(event);
355                         else if (object == miExit)
356                             miExit_Action(event);
357                         //bps ----------------------------------------------------------------
358                         //bps Add ActionListener for
359                         //bps menu items for file new, open and save,
360                         //bps for selecting, creating or deleting 3 d
361                         //bps process spaces
362                         //bps for editing items such as cut, add,
363                         //bps copy, paste
364                         //bps ----------------------------------------------------------------
365                 }
366             }
367
368             void miAbout_Action(java.awt.event.ActionEvent event)
369             {
370                 //{{CONNECTION
371                 // Action from About Create and show as modal
372                 (new AboutDialog(this, true)).show();
373                 //}}
374             }
375             void miExit_Action(java.awt.event.ActionEvent event)
376             {
377                 //{{CONNECTION
378                 // Action from Exit Create and show as modal
379                 (new QuitDialog(this, true)).show();
380                 //}}
381             }
382             void miOpen_Action(java.awt.event.ActionEvent event)
383             {
384                 //{{CONNECTION
385                 // Action from Open . . . Show the OpenFileDialog
386                 openFileDialog1.show();
387                 //}}
388             }
```

TABLE 2

FILE MENU PULL DOWN PROCESSING

| | |
|---|---|
| 1 | //bps Likewise, for File menu pulldowns, add |
| 2 | //bps handlers here. |
| 3 | //bps |
| 4 | //bps For File-New |
| 5 | //bps     prompt user for file name (validate input) |
| 6 | //bps     create file, then |
| 7 | //bps     create a space: |
| 8 | //bps     prompt user for space name and |
| 9 | //bps     dimensions(include validate |
| 10 | //bps     then new uspname = ProcessSpace (uinput1, |
| 11 | //bps     uinput2, uinput3); |
| 12 | //bps |
| 13 | //bps For File-Open |
| 14 | //bps     prompt user for file name (fn) (validate |
| 15 | //bps     input) |
| 16 | //bps     threedspace = new ProcessSpace(fn); |
| 17 | //bps For File-Save |
| 18 | //bps     filename already exists, so ask the space to |
| 19 | //bps     save itself |
| 20 | //bps     ProcessSpace.save(); |
| 21 | //bps |
| 22 | //bps For File-SaveAs |
| 23 | //bps     prompt user for file name and validate, |
| 24 | //bps     ProcessSpace.save(fn) |
| 25 | //bps |

TABLE 3

EDIT MENU PULL DOWN PROCESSING

| | |
|---|---|
| 1 | //bps Likewise for editing process space entries: |
| 2 | //bps |
| 3 | //bps For edit-cut |
| 4 | //bps     keep cut entry on clipboard just in case a |
| 5 | //bps     paste is used |
| 6 | //bps     For the Dimension in question |
| 7 | //bps     For the item selected (highlighted), obtain |
| 8 | //bps     Dimension call the Dimension and delete the |
| 9 | //bps     item |
| 10 | //bps thisDimension.deleteItem |
| 11 | //bps     (item-that-is-highlighted); |
| 12 | //bps |
| 13 | //bps For edit-add |
| 14 | //bps     For the Dimension in question |
| 15 | //bps     Prompt the user for the new entry, |
| 16 | //bps     thisDimension.addItem(item-prompted-for); |
| 17 | //bps |
| 18 | //bps For edit-copy |
| 19 | //bps     For the Dimension in question |
| 20 | //bps     copy the selected (highlighted) item to |
| 21 | //bps     clipboard |
| 22 | //bps |
| 23 | //bps For edit-paste |
| 24 | //bps     For the Dimension in question |
| 25 | //bps     this.Dimension.addItem(from-clipboard); |
| 26 | //bps |
| 27 | //bps ------------------------------------------------------------------ |
| 28 | class SymItem implements java.awt.event.ItemListener |
| 29 | { |
| 30 |     public void itemStateChanged |
| 31 |         (java.awt.event.ItemEvent event) |
| 32 |     { |
| 33 |         Object object = event.getSource(); |
| 34 |         if (object == NounList) |
| 35 |             NounList_ItemStateChanged(event); |
| 36 |         else if (object == VerbList) |
| 37 |             VerbList_ItemStateChanged(event); |
| 38 |         else if (object == AttributeList) |
| 39 |             AttributeList_ItemStateChanged(event); |
| 40 |     } |
| 41 | } |
| 42 | void NounList_ItemStateChanged |
| 43 | (java.awt.event.ItemEvent event) |
| 44 | { |

TABLE 3-continued

EDIT MENU PULL DOWN PROCESSING

```
45              // to do: code goes here.
46
47              //{{CONNECTION
48              // Repaint the BorderPanel
49              {
50                  borderPanel1.repaint();
51              }
52              //}}
53          }
54          void VerbList_ItemStateChanged
55              (java.awt.event.ItemEvent event)
56          {
57              // to do: code goes here.
58
59              //{{CONNECTION
60              // Repaint the BorderPanel
61              {
62                  borderPanel1.repaint();
63              }
64              //}}
65          }
66          void AttributeList_ItemStateChanged
67              (java.awt.event.ItemEvent event)
68          {
69              // to do: code goes here.
70
71              //{{CONNECTION
72              // Repaint the BorderPanel
73              {
74                  borderPanel1.repaint();
75              }
76              //}}
77      }
```

TABLE 4

3D PROCESS MENU PULL DOWN PROCESSING

```
1       //bps ---------------------------------------------------------------
2       //bps void mi3DProcess_Action(java.awt.even.ActionEvent
3       //bps event) for when a user selects this and chooses
4       //bps a separate S3DProcess, C3DProcess and D3DProcess
5       //bps Add action processor to handle the selection,
6       //bps creation and deletion of 3 d process spaces.
7       //bps
8       //bps To select a space,
9       //bps    prompt user for space name (include validate)
10      //bps    then ProcessSpace.show
11      //bps
12      //bps To create a space,
13      //bps    prompt user for space name and
14      //bps    dimensions(include validate
15      //bps    then new uspname = ProcessSpace (uinput1,
16      //bps    uinput2, uinput3);
17      //bps
18      //bps To delete a space,
19      //bps    prompt user for space name and validate and
20      //bps    delete
21      //bps
```

TABLE 5

MOUSE ADAPTER

```
1       }
2       class SymMouse extends java.awt.event.MouseAdapter
3       {
4           public void mousePressed(java.awt.event.MouseEvent event)
5           {
```

TABLE 5-continued

MOUSE ADAPTER

```
 6              Object object = event.getSource();
 7              if (object == borderPanel1)
 8                  borderPanel1_mousePressed(event);
 9          }
10          public void mouseReleased(java.awt.event.MouseEvent event)
11          {
12              Object object = event.getSource();
13              if (object == NounList)
14                  NounList_MouseRelease(event);
15              else if (object == VerbList)
16                  VerbList_MouseRelease(event);
17              else if (object == AttributeList)
18                  AttributeList_MouseRelease(event);
19          }
20          public void mouseClicked(java.awt.event.MouseEvent event)
21          {
22              Object object = event.getSource();
23              if (object == NounList)
24                  NounList_MouseClick(event);
25              else if (object == VerbList)
26                  VerbList_MouseClick(event);
27              else if (object == AttributeList)
28                  AttributeList_MouseClick(event);
29              else if (object == borderPanel1)
30                  borderPanel1_mouseClicked(event);
31          }
32      }
33      void NounList_MouseClick(java.awt.event.MouseEvent event)
34      {
35          // to do: code goes here.
36
37          //{{CONNECTION
38          // Repaint the BorderPanel
39          {
40              borderPanel1.repaint();
41          }
42          //}}
43      }
44      void VerbList_MouseClick(java.awt.event.MouseEvent event)
45      {
46          // to do: code goes here.
47
48          //{{CONNECTION
49          // Repaint the BorderPanel
50          {
51              borderPanel1.repaint();
52          }
53          //}}
54      }
55      void AttributeList_MouseClick(java.awt.event.MouseEvent event)
56      {
57          // to do: code goes here.
58
59          //{{CONNECTION
60          // Repaint the BorderPanel
61          {
62              borderPanel1.repaint();
63          }
64          //}}
65      }
66      class SymMouseMotion extends java.awt.event.MouseMotionAdapter
67      {
68          public void mouseDragged(java.awt.event.MouseEvent event)
69          {
70              Object object = event.getSource();
71              if (object == NounList)
72                  NounList_MouseDrag(event);
73              else if (object == VerbList)
74                  VerbList_MouseDrag(event);
75              else if (object == AttributeList)
76                  AttributeList_MouseDrag(event);
77          }
78      }
79      void NounList_MouseDrag (java.awt.event.MouseEvent event)
80      {
81          // to do: code goes here.
82          // noun list being moved — reflect changes on +X axis
```

TABLE 5-continued

MOUSE ADAPTER

```
 83             // circlecursor is at 122,156 origin
 84             // circurpoint holds the latest x,y values for the
 85             // origin of the cursor
 86
 87
 88             CircleCursor.reshape( circurpoint.x + event.getY(),
 89                circurpoint.y, 6, 6);
 90             //{{CONNECTION
 91             // Repaint the BorderPanel
 92             {
 93                borderPanel1.repaint();
 94             }
 95             //}}
 96         }
 97         void VerbList_MouseDrag(java.awt.event.MouseEvent event)
 98         {
 99             // to do: code goes here.
100             CircleCursor.reshape( circurpoint.x - event.getY(),
101                circurpoint.y + event.getY(), 6, 6);
102             //{{CONNECTION
103             // Repaint the BorderPanel
104             {
105                borderPanel1.repaint();
106             }
107             //}}
108         }
109         void AttributeList_MouseDrag(java.awt.event.MouseEvent event)
110         {
111             // to do: code goes here.
112             CircleCursor.reshape( circurpoint.x, circurpoint.y
113                + event.getY(), 6, 6);
114             //{{CONNECTION
115             // Repaint the BorderPanel
116             {
117                borderPanel1.repaint();
118             }
119             //}}
120         }
121         void NounList_MouseRelease(java.awt.event.MouseEvent event)
122         {
123             // to do: code goes here.
124             circurpoint.x += event.getY();
125             //{{CONNECTION
126             // Repaint the BorderPanel
127             {
128                borderPanel1.repaint();
129             }
130             //}}
131         }
132         void VerbList_MouseRelease (java.awt.event.MouseEvent event)
133         {
134             // to do: code goes here.
135             circurpoint.x -= event.getY();
136             circurpoint.y += event.getY();
137             //{{CONNECTION
138             // Repaint the BorderPanel
139             {
140                borderPanel1.repaint();
141             }
142             //}}
143         }
144         void AttributeList_MouseRelease(java.awt.event.MouseEvent event)
145         {
146             // to do: code goes here.
147             circurpoint.y += event.getY();
148             //{{CONNECTION
149             // Repaint the BorderPanel
150             {
151                borderPanel1.repaint();
152             }
153             //}}
154         }
155         void borderPanel1_mouseClicked(java.awt.event.MouseEvent event)
156         {
157             // to do: code goes here.
158             //bps ---------------------------------------------------
159             //bps An alternative to making the choice box
```

TABLE 5-continued

MOUSE ADAPTER

| | |
|---|---|
| 160 | //bps visible is to monitor for a |
| 161 | //bps right mouse button click, |
| 162 | //bps Check to see if the cursor is pointing to a |
| 163 | //bps ProcessPoint |
| 164 | //bps Highlight the ProcessPoint (so the user |
| 165 | //bps knows it's the right |
| 166 | //bps one, and show the choice box for that |
| 167 | //bps ProcessPoint. |
| 168 | //bps In addition, highlight the intersections of |
| 169 | //bps that ProcessPoint on that axis. |
| 170 | //bps ---------------------------------------------------- |
| 171 | //{{CONNECTION |
| 172 | // Toggle show/hide |
| 173 | choice1.setVisible(!choice1.isVisible()); |
| 174 | //}} |
| 175 | } |
| 176 | void borderPanel1_mousePressed(java.awt.event.MouseEvent event) |
| 177 | { |
| 178 | // to do: code goes here. |
| 179 | |
| 180 | //{{CONNECTION |
| 181 | // Show the Choice |
| 182 | choice1.setVisible(true); |
| 183 | //}} |
| 184 | } |

TABLE 6

CHOICE PANEL

| | |
|---|---|
| 1 | //bps ---------------------------------------------------- |
| 2 | //bps Once it's determined that a MouseEvent occurred, |
| 3 | //bps the choice panel becomes visible and presents a |
| 4 | //bps list of choices to the user. |
| 5 | //bps Depending on what choice is selected, appropriate |
| 6 | //bps calls are made to the respective handlers. |
| 7 | //bps |
| 8 | //bps Note — for convenience, if a process point does |
| 9 | //bps not allow an action, that menu item is "grayed" |
| 10 | //bps out and is not accessible |
| 11 | //bps |
| 12 | //bps For ShowProcessDefinition, a call is made — |
| 13 | //bps     ForThisProcessPoint.show(); |
| 14 | //bps |
| 15 | //bps For Zoom In, first the point is checked for |
| 16 | //bps zoomability, and then if ok, it zigs |
| 17 | //bps If ForThisProcessPoint.isZoomableIn(); |
| 18 | //bps     ForThisProcessSpace = |
| 19 | //bps         ForThisProcessPoint.getProcess(); |
| 20 | //bps     ForThisProcessSpace.zoomIn(); |
| 21 | //bps    Then highlight the point. |
| 22 | //bps |
| 23 | //bps For Zoom out, first the point is checked for |
| 24 | //bps zoomability, and then if ok, it zags as follows. |
| 25 | //bps If ForThisProcessPoint.isZoomableOut(); |
| 26 | //bps     If ForThisProcessSpace = |
| 27 | //bps         ForThisProcessPoint.getProcess() exists |
| 28 | //bps     Then ForThisProcessSpace.zoomOut(); |
| 29 | //bps       else Create a new process space |
| 30 | //bps       by first creating a new GUI Frame (user will |
| 31 | //bps       be prompted input the dimension values for |
| 32 | //bps       this point.) |
| 33 | //bps    And highlight the point |
| 34 | //bps |
| 35 | //bps Print the object |
| 36 | //bps |
| 37 | //bps Run Process invokes the appropriate |
| 38 | //bps registered process starter |
| 39 | //bps for a particular workflow tool |
| 40 | } |

TABLE 7

PROCESS SPACE

```
1    //----- ProcessSpace.java -----------------------------------------------------
2    //
3    //
4    //        Part of Business Process Space prototype
5    //
6    import java.lang.*;
7    import java.util.*;
8    //--------------------------------------------------------------------------------
9    public class ProcessSpace {
10       private      ProcessPoint   origin_;
11       protected    Dimension      nouns_, verbs_, attributes_;
12       protected    ProcessPoint   within_ = null;
13       public       String         name_;
14       ProcessSpace() {
15           nouns_       = new Dimension( "noun" );
16           verbs_       = new Dimension( "verb" );
17           attributes_  = new Dimension( "attr" );
18           generatespace();
19           } // ctor 1 of 4
20       ProcessSpace( ProcessPoint p ) {
21           within_      = p;
22           nouns_       = new Dimension( "noun" );
23           verbs_       = new Dimension( "verb" );
24           attributes_  = new Dimension( "attr" );
25           generatespace();
26           } // ctor 2 of 4
27       ProcessSpace( Dimension n, Dimension v, Dimension a) {
28           nouns_       = n;
29           verbs_       = v;
30           attributes_  = a;
31           n.setProcessSpace( this );
32           v.setProcessSpace( this );
33           a.setProcessSpace( this );
34           generatespace();
35           } // ctor 3 of 4
36       ProcessSpace( ProcessPoint p,
37                     Dimension n, Dimension v, Dimension a ) {
38           within_      = p;
39           nouns_       = n;
40           verbs_       = v;
41           attributes_  = a;
42           generatespace();
43           } // ctor 4 of 4
44       private void generatespace() {
45           DimensionItem n, v, a;
46           n = new DimensionItem( nouns_, "origin" );
47           v = new DimensionItem( verbs_, "origin" );
48           a = new DimensionItem( attributes_, "origin" );
49           origin_ = new ProcessPoint( n, v, a );
50           n.setPoint( origin_ );
51           v.setPoint( origin_ );
52           a.setPoint( origin_ );
53           for (Enumeration en = nouns_.getItems();
54                en.hasMoreElements(); ) {
55                n = (DimensionItem)en.nextElement();
56                for (Enumeration ev = verbs_.getItems();
57                     ev.hasMoreElements(); ) {
58                     v = (DimensionItem)ev.nextElement();
59                     for (Enumeration ea = attributes_.getItems();
60                          ea.hasMoreElements(); ) {
61                          try {
62                              a = (DimensionItem)ea.nextElement();
63                              ProcessPoint p = new ProcessPoint( n,
64                                  v, a );
65                              n.setPoint( p );
66                              v.setPoint( p );
67                              a.setPoint( p );
68                              }
69                          catch( NoSuchElementException ee ) {
70                              break;
71                              }
72                          }
73                     }
74                }
75           } // generatespace()
76       public Dimension getDimension( String n ) {
77           if (n == "noun") return nouns_;
```

TABLE 7-continued

PROCESS SPACE

```
78          else if (n == "verb") return verbs_;
79          else if (n.startsWith("attr")) return attributes_;
80          return null;
81       }
82       public ProcessPoint createSpaceAround() {
83          return within_ = new ProcessPoint();
84       }
93       // following are simple aliases for createSpaceAround()
94       public ProcessPoint createSpaceContaining() { return
95          createSpaceAround(); }
96       public ProcessPoint createPointContaining() { return
97          createSpaceAround(); }
98       public ProcessPoint createSpaceContext() { return
99          createSpaceAround(); }
100      public ProcessPoint createPointContext() { return
101         createSpaceAround(); }
102      public ProcessPoint createContext() { return
103         createSpaceAround(); }
104      public void deleteSpaceAround() { within_ = null; }
105      public void setContainingPoint( ProcessPoint p ) {
106         within_ = p; }
107      public ProcessPoint zoomOut() { return within_; }
108      public int capacity() { return nouns_.numberOfItems() *
109                                    verbs_.numberOfItems() *
110                                    attributes_.numberOfItems(); }
111      public int size() { // returns number of ProcessPoints
112         int ans = 0;
113         for (Enumeration en = nouns_.getItems();
114         en.hasMoreElements(); ) {
115            DimensionItem n =
116               (DimensionItem)en.nextElement();
117            for (Enumeration ev = verbs_.getItems();
118         ev.hasMoreElements(); ) {
119               DimensionItem v = (DimensionItem)ev.nextElement();
120               for (Enumeration ea = attributes_.getItems();
121            ea.hasMoreElements(); ) {
122                  DimensionItem a =
123                     (DimensionItem)ea.nextElement();
124                  if ( a.getPoint() != null ) ++ans;
125               }
126            }
127         }
128         return ans;
129      } // size()
130      public int numberOfProcessDefinition() {
131         int ans = 0;
132         for (Enumeration en = nouns_.getItems();
133         en.hasMoreElements(); ) {
134            DimensionItem n =
135            (DimensionItem)en.nextElement();
136            for (Enumeration ev = verbs_.getItems();
137         ev.hasMoreElements(); ) {
138            DimensionItem v = (DimensionItem)ev.nextElement();
139               for (Enumeration ea = attributes_.getItems();
140                  ea.hasMoreElements(); ) {
141                  DimensionItem a =
142                     (DimensionItem)ea.nextElement();
143                  if ( a.getPoint() != null &&
144                     a. getPoint().hasProcessDefinition()
145                     ) ++ans;
146               }
147            }
148         }
149         return ans;
150      } // numberOfProcessDefinition()
151      public boolean isZoomableOut() { return within_ != null; }
152      public void show() {
153         System.out.println
154            ( "\nProcessSpace:    capacity=" + capacity() +
155                               "   num points=" + size() +
156                               "   num defs=" +
157                                  numberOfProcessDefinition() +
158                               "   zoomout=" + isZoomableOut() );
159         System.out.println( nouns_ );
160         nouns_.printItems();
161         System.out.println( verbs_ );
162         verbs_.printItems();
```

TABLE 7-continued

PROCESS SPACE

```
163            System.out.println( attributes__ );
164            attributes__.printItems();
165          }
166    //---------------------------------------------------------------------------
167    // main() for stand-alone testing, as an 'application'.
168    // It allows simple checkout of creation and navigation
169    // capabilities.
170    public static void main( String args ) {
171        Dimension  n2 = new Dimension( "noun" ),
172                   v2 = new Dimension( "verb" ),
173                   a2 = new Dimension( "attribute" ),
174                   n3 = new Dimension( "noun" ),
175                   v3 = new Dimension( "verb" ),
176                   a3 = new Dimension( "attribute" ),
177                   n1 = new Dimension( "noun" ),
178                   v1 = new Dimension( "verb" ),
179                   a1 = new Dimension( "attribute" );
180        n3.addItems( "dept1 dept2 projectA dept3" );
181        v3.addItems( "unittest componentbringup CT
182              systemarch" );
183        a3.addItems( "software hardware checkpoint review" );
184        n2.addItems( "div7 busunitU1 div2 busunitU3" );
185        v2.addItems( "costestimate projectplan checkpoint" );
186        a2.addItems( "management technical executive" );
187        n1.addItems( "companyA" );
188        v1.addItems( "finance, logistics, engineering,
189              humanresources" );
190        a1.addItems( "all" );
191        // create & show intermediate space
192        ProcessSpace sp = new ProcessSpace( n2, v2, a2 );
193        sp.show();
194        // create containing point & its space, show space
195        ProcessPoint pp = sp.createSpaceAround();
196        pp.createProcessSpace
197              ( "companyA", "logistics", "all" );
198        pp.getDimension( "noun" ).addItems( "companyA" );
199        pp.getDimension( "verb" ).addItems( "finance,
200              logistics, " + "engineering, humanresources" );
201        pp.getDimension( "attr" ).addItems( "all" );
202        pp.getProcessSpace().show();
203        // create & show nested space
204        pp.createSpaceWithin( n3, v3, a3 );
205        pp.zoomIn().show();
206        // add an item to a nested space dimension
207        System.out.println("\n-- item add --");
208        Dimension d = pp.zoomIn().getDimension( "verb" );
209        d.addItem( new DimensionItem( d, "hire a person" ));
210        pp.zoomIn().show();
211        // delete a dimension item in intermediate space
212        System.out.println("\n-- item delete --");
213        boolean b = sp.getDimension( "noun" ).deleteItem(
214              "div2" );
215        if (b == true) sp.show();
216        else System.out.println("        . . . delete failed");
217        } // main()
218    } // class ProcessSpace
219 //------------------------------------------------------------------------ eof ---
```

TABLE 8

DIMENSION

```
1   //----------------------------------------------------------------------------
2   Dimension.java ----
3   //
4   //        Part of Business Process Space prototype
5   //
6   import java.lang.*;
7   import java.util.*;
8   //----------------------------------------------------------------------------
9   public class Dimension {
10      private    Vector    values__;    // an ordered list of dimension
11                                         // values
12                                         // 'origin' is 1st DimensionItem
```

TABLE 8-continued

| DIMENSION |
| --- |

```
13      public      String       name__,
14                               type__;       // noun, verb or attribute
15      private     ProcessSpace space__ = null;
16      Dimension( String t ) {
17          type__ = t;
18          values__ = new Vector();
19      }
20      public void addItem( DimensionItem di ) {
21          values__.addElement(di);
22      }
23      public void addItem( String sv ) {
24          addItem( new DimensionItem( this, sv ) );
25      }
26      public void addItems( String itemlist ) {
27          // comma or blank delimited list of items
28          StringTokenizer st = new StringTokenizer( itemlist );
29          while ( st.hasMoreTokens() ) {
30              String v = st.nextToken();
31              if (findDimensionItem( v ) != null) return;
32              addItem( new DimensionItem( this, v ));
33          }
34      }
35      public boolean deleteItem( DimensionItem di ) {
36          values__.removeElement( di );
37          return true;
38      }
39      public boolean deleteItem( String divalue ) {
40          Enumeration e = values__.elements();
41          while ( e.hasMoreElements() ) {
42              DimensionItem di =
43                  (DimensionItem)e.nextElement();
44              if ( divalue.equals(di.value__) ) {
45                  values__.removeElement( di );
46                  return true;
47              }
48          }
49          return false;
50      }
51      public DimensionItem findDimensionItem( String v ) {
52          Enumeration e = values__.elements();
53          while ( e.hasMoreElements() ) {
54              DimensionItem di =
55                  (DimensionItem)e.nextElement();
56              if ( v == di.value__ ) return di;
57          }
58          return null;
59      }
60      public void setProcessSpace( ProcessSpace ps ) {
61          space__ = ps;
62      }
63      public boolean isZoomableOut() { return
64          space__.isZoomableOut(); }
65      public ProcessSpace getProcessSpace() { return space__; }
66      public Enumeration getItems() {
67          return values__.elements();
68      }
69      public int numberOfItems() { return values__.size(); }
70      public void printItems() {
71          Enumeration e = getItems();
72          while ( e.hasMoreElements() ) {
73              System.out.println( e.nextElement() );
74          }
75      }
76      public String toString() {
77          return "Dimension: " + type__ + "     num items=" +
78              values__.size();
79      }
80      DimensionItem previousItem( DimensionItem c ) {
81          if (c == null ) return null;
82          int i = values__.indexOf( c );
83          try { return (DimensionItem)values__.elementAt(i-1); }
84          catch (ArrayIndexOutOfBoundsException e)
85              { return null; }
86      }
87      DimensionItem nextItem( DimensionItem c ) {
88          if (c==null) return null;
89          int i = values__.indexOf( c );
```

TABLE 8-continued

DIMENSION

```
90          try { return (DimensionItem)values_.elementAt(i+1); }
91          catch (ArrayIndexOutOfBoundsException e)
92             { return null; }
93          }
94       } // class Dimension
95  //-------------------------------------------------------------------------- eof ---
```

TABLE 9

DIMENSION ITEM

```
 1   //------ DimensionItem.java -----------------------------------
 2   //
 3   //       Part of Business Process Space prototype
 4   //
 5   import java.lang.*;
 6   import java.util.*;
 7   //----------------------------------------------------------------
 8   public class DimensionItem {
 9        public String          description_  = null,
10                               name_         = null,
11                               value_;
12        private Dimension      dimension_;
13        private ProcessPoint   mypoint_      = null;
14        DimensionItem( Dimension d, String v ) {
15             dimension_ = d;
16             value_ = v;
17        }
```

TABLE 9-continued

DIMENSION ITEM

```
18        DimensionItem( Dimension d, String n, String v ) {
19             dimension_ = d;
20             name_ = n;
21             value_ = v;
22        }
23        public String toString() {
24             return "     DimensionItem: name=" + name_ +
25                  ", value=" + value_;
26        }
27        public Dimension getDimension() { return dimension_; }
28        public ProcessSpace getDimensionSpace() {
29             return dimension_.getProcessSpace();
30        }
31        public void setPoint( ProcessPoint p ) { mypoint_ = p; }
32        public ProcessPoint getPoint() { return mypoint_; }
33   } // class DimensionItem
34   //------------------------------------------------------------------ eof ----
```

TABLE 10

PROCESS POINT

```
 1   //----- ProcessPoint.java ------------------------------------------------
 2   //
 3   //       Part of Business Process Space prototype
 4   //
 5   import java.lang.*;
 6   import java.util.*;
 7   //-----------------------------------------------------------------------------
 8   public class ProcessPoint {
 9        public final int          UP = 1, DOWN = 0;
10        private   DimensionItem   noun_, verb_, attribute_;
11        private   ProcessSpace    contains_;
12        public    ProcessDefinition  def_;
13        ProcessPoint() { noun_ = verb_ = attribute_ = null; }
14        ProcessPoint( DimensionItem n, DimensionItem v,
15             DimensionItem a ) {
16                  noun_ = n;       verb_ = v;       attribute_ = a;
17             }
29        public void setProcess( ProcessDefinition pd ) { def_ = pd; }
30        public ProcessDefinition getProcess() { return def_; }
31        public Dimension getDimension( String n ) {
32             if (n == "noun") return noun_.getDimension();
33             else if (n == "verb") return verb_.getDimension();
34             else if (n.startsWith("attr")) return
35                  attribute_.getDimension();
36             return null;
37        }
38        public DimensionItem getDimensionItem( String dt ) {
39             if (dt == "noun") return noun_;
```

TABLE 10-continued

PROCESS POINT

```
 40             else if (dt == "verb") return verb_;
 41             else if (dt.startsWith("attr")) return attribute_;
 42             return null;
 43         }
 44     //
 45     // following directions apply to all dimensions
 46     // directions;   'up' == means away from origin
 47     //              'down' == means toward origin
 48     //
 49     public ProcessPoint getNeighboor( Dimension d, int
 50       direction ) {
 51         DimensionItem curitem = null, newitem = null;
 52         if (d.type == "noun") curitem = noun_;
 53         else if (d.type_ == "verb") curitem = verb_;
 54         else if (d.type_ == "attr") curitem = attribute_;
 55         if (direction == UP) newitem = d.nextItem( curitem );
 56         else newitem = d.previousItem( curitem );
 57         if ( newitem != null ) return newitem.getPoint();
 58         else return null;
 59         }
 60     public ProcessSpace createSpaceWithin(   Dimension n,
 61                                              Dimension v,
 62                                              Dimension a ) {
 63         return contains_ = new ProcessSpace( this, n,v,a );
 64         }
 65     public void createProcessSpace(    String nv,
 66                                        String vv,
 67                                        String av ) {
 68         Dimension  nd = new Dimension( "noun" ),
 69                    vd = new Dimension( "verb" ),
 70                    ad = new Dimension( "attribute" );
 71         nd.addItem( nv );
 72         vd.addItem( vv );
 73         ad.addItem( av );
 74         ProcessSpace sp = new ProcessSpace( nd, vd, ad );
 75         noun_ = nd.findDimensionItem( nv );
 76         noun_.setPoint( this );
 77         verb_ = vd.findDimensionItem( vv );
 78         verb_.setPoint( this );
 79         attribute_ = ad.findDimensionItem( av );
 80         attribute_.setPoint( this );
 81         } // createProcessSpace()
 82     public ProcessSpace getProcessSpace() {
 83         return noun_.getDimensionSpace();
 84         }
 85     public void deleteSpaceWithin() { contains_ = null; }
 86     public ProcessSpace zoomIn() { return contains_; }
 87     public ProcessPoint zoomOut() {
 88         return noun_.getDimensionSpace().zoomOut();
 89         }
 90     public ProcessSpace zoomOutToSpace() {
 91         return zoomOut().getDimensionItem("noun")
 92                         .getDimensionSpace();
 93         }
 94     public boolean isZoomable() { return contains_ != null ]]
 95                                          isZoomableOut();          }
 96     public boolean isZoomableIn() { return contains_ != null;}
 97     public boolean iszoomableout() {
 98         return noun_.getDimension().isZoomableOut();
 99         }
100     public boolean hasProcessDefinition() { return def_ != null; }
101     public void show() {
102         System.out.println
103             ("         ProcessPoint: \n" + noun_ +
104                              "\n   " + verb_ +
105                              "\n   " + attribute_ );
106         if (def_!=null) System.out.println
107             ("         def name=" +
108                                         def_.getName() );
109         else System.out.println("           def name=null");
110         System.out.println
111             ("     zoomout=" + isZoomableOut() +
112                             ", zoomin=" + isZoomableIn() );
113         }
114     } // class ProcessPoint
115 //-------------------------------------------------------------- eof ---
```

TABLE 11

PROCESS DEFINITION

```
1   //------ ProcessDefinition.java -------------------------------------
2   //
3   //
4   //
5   //
6   import java.lang.*;
7   import java.util.*;
8   //---------------------------------------------------------------
9   public class ProcessDefinition {
10      String      name__, vendor__, textdefinition__;
11      Vector      subprocesses__;
12      Date        create__, lastupdate__;
13      ProcessDefinition( String n, String v, String d ) {
14          name__ = n;
15          vendor__ = v;
16          textdefinition__ = d;
17          create__ = lastupdate__ = new Date();
18      }
19      public String tostring()
20              { return name__ + ", " + vendor__; }
21      public String getName()
22              { return name__; }
23      public String getDefinition()
24              { return textdefinition__; }
25      public void addSubprocess( ProcessPoint p )
26              { subprocesses__.addElement( p ); }
27      public Enumeration getSubprocesses()
28              { return      subprocesses__.elements(); }
29      public boolean startInstance() {
30          // Using external, vendor-product specific
31          // interfaces, begin a new instantiation
32          // of this process.
33          //
34          // Return 'false' only if a new instance could not be
35          // successfully started, return 'true' otherwise.
36          return true;
37      }
38      public boolean isRunning() {
39          // Determine, in a vendor-product specific manner,
40          // whether an instance of this process is
41          // running now.
42          return false;
43      }
44      public void editProcessDefinition() {
45          // In a vendor-product specific manner, begin an
46          // external edit session using vendor-supplied tools,
47          // of this process definition (its 'source code').
48      }
49  } // class ProcessDefinition
50  //-------------------------------------------------------- eof ---
```

Advantages Over the Prior Art

In accordance with the invention, the preferred embodiment of this invention provides a system and method for enabling understanding of the mechanisms, interactions and inter-relationships of business processes.

Further, the invention provides a method and system for systematically defining the current and future processes of an organization in a manner which facilitates understanding, use and change.

Further, the invention provide an overall business context in which to know and evaluate processes impacted by a policy.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for representing business processes comprising the steps of:

defining each of a plurality of processes as a 3-tuple including a noun, a verb and an attribute; and displaying a selected process as a point in navigation space;

responsive to user selection of a zoom in action in connection with a selected process point, determining if said selected process point is zoomable; and, if so highlighting in a new navigation space the process points referenced by selected process point definitions responsive to user selection of a zoom operation with respect to a first process displayed in a first navigation space in a first window, opening a second window to display the zoomed to process space in a second navigation space, and highlighting said first process point in said first window.

2. Method for relating business processes to a business organization and roles of people, comprising the steps of:

defining each of a plurality of processes as a 3-tuple including a noun, a verb and an attribute;

displaying selection lists, including a noun selection list, a verb selection list and an attribute selection list; and displaying said plurality of processes as a collection of points in navigation space representing a logical hierarchy of relations between and among said business processes accessible responsive to user selection of a 3-tuple to determine process definition and execution ownership.

3. Method for delivering workflow solutions that are immediately useful for customers and readily modified by said customers, comprising the steps of:

providing to a customer a generic business process representation including a set of points in n-dimensional space, each point including at least one verb dimension, at least one noun dimension, and at least one attributes dimension; and enabling said customer by selecting a said point to modify said representation for the process represented by said point by selectively adding, deleting and changing a set of actions representing said verb dimension, a set of managed resource objects representing said noun dimension, and a set of expressions representing said attributes dimension, each said expression being capable of evaluation to a Boolean value.

4. Method for capturing in workflow solutions the policies a business uses to guide its activities, comprising the steps of:

visually displaying in a display panel a navigation space and a plurality of scrollable lists including a noun list, a verbs list and an attributes list;

responsive to selection of a noun list entry, a verbs list entry, and an attributes list entry, highlighting in said navigation space a point representing a process tuple;

responsive to selection of two entries from two of said lists, highlighting in said navigation space a highlighted plane of points representing process tuples for all entries in the list not selected;

responsive to selection of a highlighted point displaying the definition of the process represented by said highlighted point.

5. The method of claim 4, further comprising the step of rendering not selectable points in said plane of points representing attributes not relevant to a selected noun and verb pair.

6. The method of claim 4, further comprising the step responsive to selection of a highlighted point of executing the process represented by said highlighted point.

7. The method of claim 4, further comprising the step responsive to user selection of selectively cutting, copying and pasting said list items.

8. The method of claim 4, further comprising the step responsive to user selection of a process point of displaying a choice box presenting to said user a plurality of selectable action items, said action items including edit process definition, show process definition, zoom in, zoom out, and run process.

9. The method of claim 8, further comprising the step of rendering non-selectable one or more action items which said user is not authorized to select.

10. The method of claim 9, further comprising the step, responsive to selection of a show process item in said choice box of displaying a process definition window for displaying the definition of a selected process and from which window said user may select an embedded object for pulling in and displaying additional material or executing said selected process.

11. Method for making known within an overall business context processes impacted by a policy, comprising the steps of:

visually displaying in a display panel a navigation space and a plurality of scrollable lists including a noun list, a verbs list and an attributes list;

representing in said navigation space a set of points in n-dimensional space, each said point being a process tuple having a verb dimension, a noun dimension, and an attributes dimension;

responsive to selection of a policy in said attributes list, highlighting in said navigation space all process tuples representing process points including said policy.

12. Method for enabling understanding of the mechanisms, interactions and inter-relationships of a business process, comprising the steps of:

representing said business process as a set of points in n-dimensional space including at least one verb dimension, at least one noun dimension, and at least one attributes dimension;

navigating said space by selecting and opening a process point to display another process representation; and extending said space selectively by redefining said dimensions and grouping scalar definitions into super scalar values.

13. The method of claim 12, further comprising the steps of:

further navigating said space to group values and back to three dimensional space representation of scalar values.

14. An article of manufacture comprising:

a computer usable medium having computer readable program code means embodied therein for displaying representations of business processes, the computer readable program means in said article of manufacture comprising:

computer readable program code means for causing a computer to effect defining each of a plurality of processes as a 3-tuple including a noun, a verb and an attribute; and computer readable program code means for causing a computer to effect displaying a selected process as a point in navigation space;

computer readable program code means for causing a computer to effect responsive to user selection of a zoom in action in connection with a selected process point, determining if said selected process point is zoomable; and, if so highlighting in a new navigation space the process points referenced by selected process point definitions; and computer readable program code means for causing a computer to effect responsive to user selection of a zoom operation with respect to a first process displayed in a first navigation space in a first window, opening a second window to display the zoomed to process space in a second navigation space, and highlighting said first process point in said first window.

15. A program storage device readable by a machine, tangibly embodying a program of instructions executable by a machine to perform method steps for relating business processes to a business organization and roles of people, said method steps comprising:

defining each of a plurality of processes as a 3-tuple including a noun, a verb and an attribute;

displaying selection lists, including a noun selection list, a verb selection list and an attribute selection list; and displaying said plurality of processes as a collection of points in navigation space representing a logical hierarchy of relations between and among said business processes accessible responsive to user selection of a 3-tuple to determine process definition and execution ownership.

16. System for making known within an overall business context processes impacted by a policy, comprising:

means for visually displaying in a display panel a navigation space and a plurality of scrollable lists including a noun list, a verbs list and an attributes list;

means for representing in said navigation space a set of points in n-dimensional space, each said point being a process tuple having a verb dimension, a noun dimension, and an attributes dimension; and means responsive to selection of a policy in said attributes list, highlighting in said navigation space all process tuples representing process points including said policy.

* * * * *